US009287753B2

(12) United States Patent
Jang

(10) Patent No.: US 9,287,753 B2
(45) Date of Patent: Mar. 15, 2016

(54) ELECTRICAL GENERATOR APPARATUS, PARTICULARLY FOR USE ON A VEHICLE ROADWAY

(71) Applicant: Jack Shihzong Jang, Delaware, OH (US)

(72) Inventor: Jack Shihzong Jang, Delaware, OH (US)

( * ) Notice: Subject to any disclaimer, the term of this patent is extended or adjusted under 35 U.S.C. 154(b) by 0 days.

(21) Appl. No.: 14/589,897

(22) Filed: Jan. 5, 2015

(65) Prior Publication Data

US 2015/0115615 A1    Apr. 30, 2015

Related U.S. Application Data

(63) Continuation-in-part of application No. 13/429,243, filed on Mar. 23, 2012, now Pat. No. 8,928,160, which is a continuation-in-part of application No. 13/075,245, filed on Mar. 30, 2011, now Pat. No. 8,164,204.

(60) Provisional application No. 61/463,477, filed on Feb. 17, 2011.

(51) Int. Cl.
| | |
|---|---|
| F02B 63/04 | (2006.01) |
| H02K 7/18 | (2006.01) |
| H02K 7/06 | (2006.01) |
| F03G 7/08 | (2006.01) |

(52) U.S. Cl.
CPC ............ *H02K 7/1853* (2013.01); *F03G 7/08* (2013.01); *H02K 7/06* (2013.01)

(58) Field of Classification Search
USPC .............. 290/1 R, 1 C; 60/325, 327, 398; 417/229; 404/71; 180/53.61
See application file for complete search history.

(56) References Cited

U.S. PATENT DOCUMENTS

| 3,859,589 | A | * | 1/1975 | Rush | ................................ 322/40 |
| 3,892,136 | A | * | 7/1975 | MacDonald | ...................... 74/14 |

(Continued)

FOREIGN PATENT DOCUMENTS

| AU | 2002302091 A1 | 6/2004 |
| CA | 2526213 A1 | 5/2007 |

(Continued)

OTHER PUBLICATIONS

Notice of Allowance in U.S. Appl. No. 13/075,245, mailed on Feb. 22, 2012.

(Continued)

*Primary Examiner* — Julio Gonzalez
(74) *Attorney, Agent, or Firm* — The Law Office of Patrick F. O'Reilly III, LLC

(57) ABSTRACT

An electrical generator system configured to convert an external actuation force applied by a vehicle traveling on a roadway into electrical energy is disclosed herein. The electrical generator system includes at least one electrical generator apparatus and a maintenance access assembly disposed adjacent to the at least one electrical generator apparatus. The maintenance access assembly includes a plurality of bounding walls defining a maintenance passageway for gaining service access to the at least one electrical generator apparatus. The maintenance access assembly further includes an access manhole disposed in an upper one of the plurality of bounding walls and above the maintenance passageway so as to facilitate access to the maintenance passageway.

10 Claims, 20 Drawing Sheets

(56) References Cited

U.S. PATENT DOCUMENTS

| | | | |
|---|---|---|---|
| 4,004,422 A | | 1/1977 | Le Van |
| 4,238,687 A | | 12/1980 | Martinez |
| 4,239,975 A | * | 12/1980 | Chiappetti ............... 290/1 R |
| 4,250,395 A | * | 2/1981 | Lundgren ............... 290/1 R |
| 4,339,920 A | | 7/1982 | Le Van |
| 5,272,378 A | | 12/1993 | Wither |
| 5,355,674 A | | 10/1994 | Rosenberg |
| 6,494,144 B1 | * | 12/2002 | Perez Sanchez ............ 104/287 |
| 6,767,161 B1 | * | 7/2004 | Calvo et al. ............... 404/71 |
| 6,858,952 B2 | | 2/2005 | Gott |
| 7,067,932 B1 | | 6/2006 | Ghassemi |
| 7,098,553 B2 | | 8/2006 | Wiegel |
| 7,102,244 B2 | | 9/2006 | Hunter, Jr. |
| 7,541,684 B1 | | 6/2009 | Valentino |
| 7,589,428 B2 | | 9/2009 | Ghassemi |
| 7,629,698 B2 | | 12/2009 | Horianopoulos et al. |
| 7,830,071 B2 | | 11/2010 | Abramovich et al. |
| 2002/0089309 A1 | | 7/2002 | Kenney |
| 2004/0042852 A1 | * | 3/2004 | Alperon ............... 404/71 |
| 2004/0160058 A1 | * | 8/2004 | Gott et al. ............... 290/1 R |
| 2005/0089370 A1 | | 4/2005 | Painchaud |
| 2005/0253459 A1 | | 11/2005 | Cole |
| 2006/0123725 A1 | | 6/2006 | Godwin |
| 2006/0147263 A1 | | 7/2006 | Hughes et al. |
| 2006/0152012 A1 | | 7/2006 | Wiegel |
| 2007/0264081 A1 | * | 11/2007 | Chiu ............... 404/71 |
| 2009/0179430 A1 | | 7/2009 | Mahawili |
| 2010/0133855 A1 | * | 6/2010 | Daya ............... 290/1 R |
| 2010/0288074 A1 | | 11/2010 | Becerra |
| 2011/0215593 A1 | * | 9/2011 | Chang et al. ............... 290/1 R |

FOREIGN PATENT DOCUMENTS

| | | |
|---|---|---|
| CA | 2545843 A1 | 11/2007 |
| CA | 2555654 A1 | 2/2008 |
| CA | 2627833 A1 | 10/2009 |
| CA | 2 654 192 C | 4/2010 |
| CN | 2133687 Y | 5/1993 |
| CN | 101042122 A | 9/2007 |
| CN | 201148944 Y | 11/2008 |
| CN | 201339553 Y | 11/2009 |
| DE | 4034219 A1 | 4/1992 |
| EP | 1519011 A1 | 3/2005 |
| EP | 2065596 A1 | 6/2009 |
| FR | 2608855 A1 | 6/1988 |
| GB | 1 332 202 A | 10/1973 |
| GB | 1602761 A | 11/1981 |
| GB | 2275828 A | 9/1994 |
| GB | 2254111 A | 11/1994 |
| GB | 2359593 A | 8/2001 |
| GB | 2409112 A | 6/2005 |
| GB | 2461860 A | 1/2010 |
| IE | 20080012 A2 | 9/2010 |
| JP | 2006214427 A | 8/2006 |
| JP | 2008167546 A | 7/2008 |
| KR | 1020040063875 A | 7/2004 |
| WO | 9516133 A1 | 6/1995 |
| WO | 99/66202 A1 | 12/1999 |
| WO | 2004076747 A2 | 9/2004 |
| WO | 2010042777 A2 | 4/2010 |
| WO | 2010088314 A2 | 8/2010 |

OTHER PUBLICATIONS

PCT Form 210, International Search Report for PCT/US2012/025684, mailed on May 23, 2012.

PCT Form 237, Written Opinion of the International Searching Authority for PCT/US2012/025684, mailed on May 23, 2012.

First office action on the merits (Non-Final Rejection) in U.S. Appl. No. 13/429,243, mailed on Apr. 25, 2014.

Notice of Allowance in U.S. Appl. No. 13/429,243, mailed on Sep. 4, 2014.

* cited by examiner

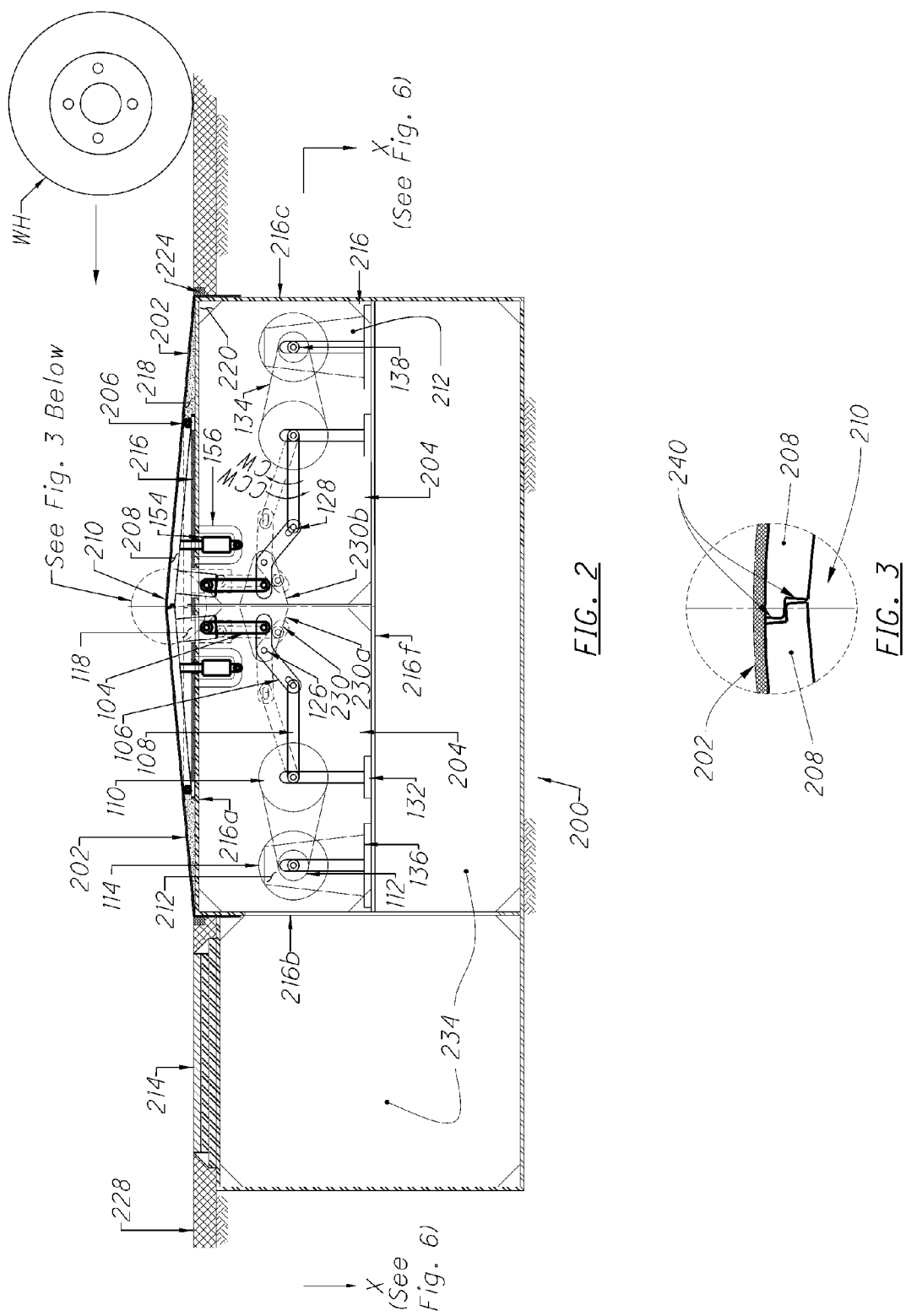

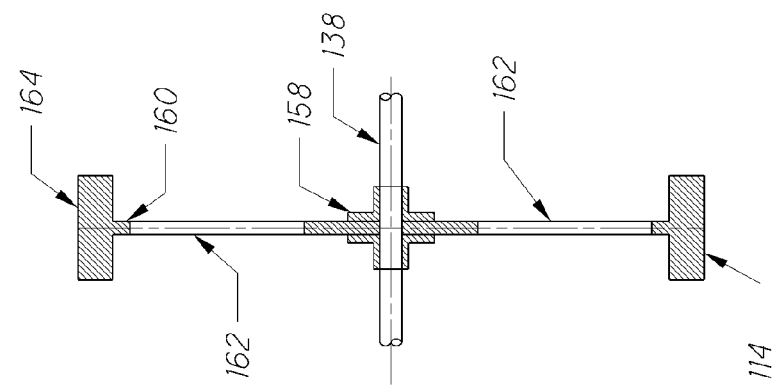
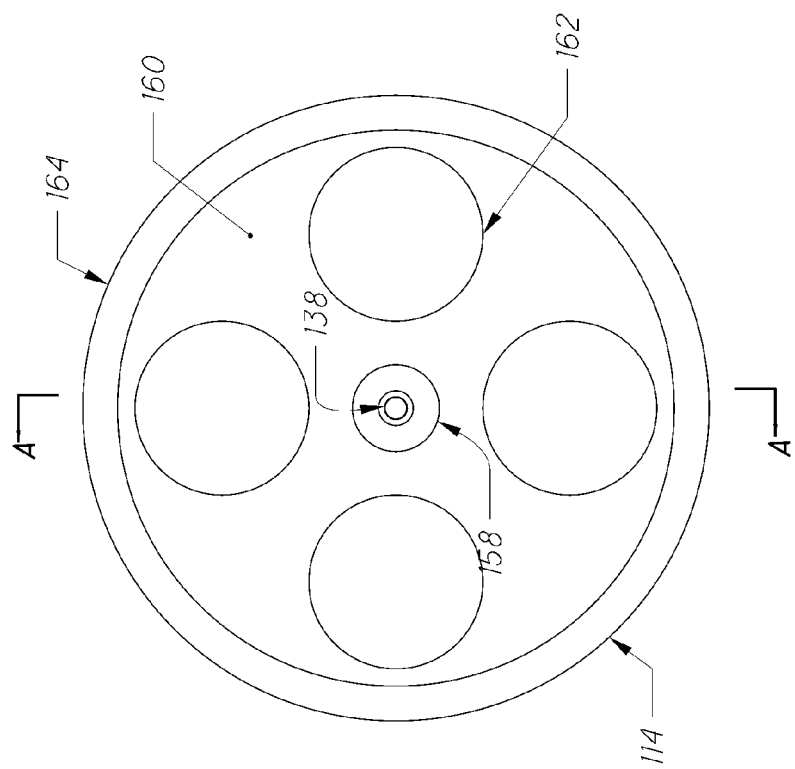

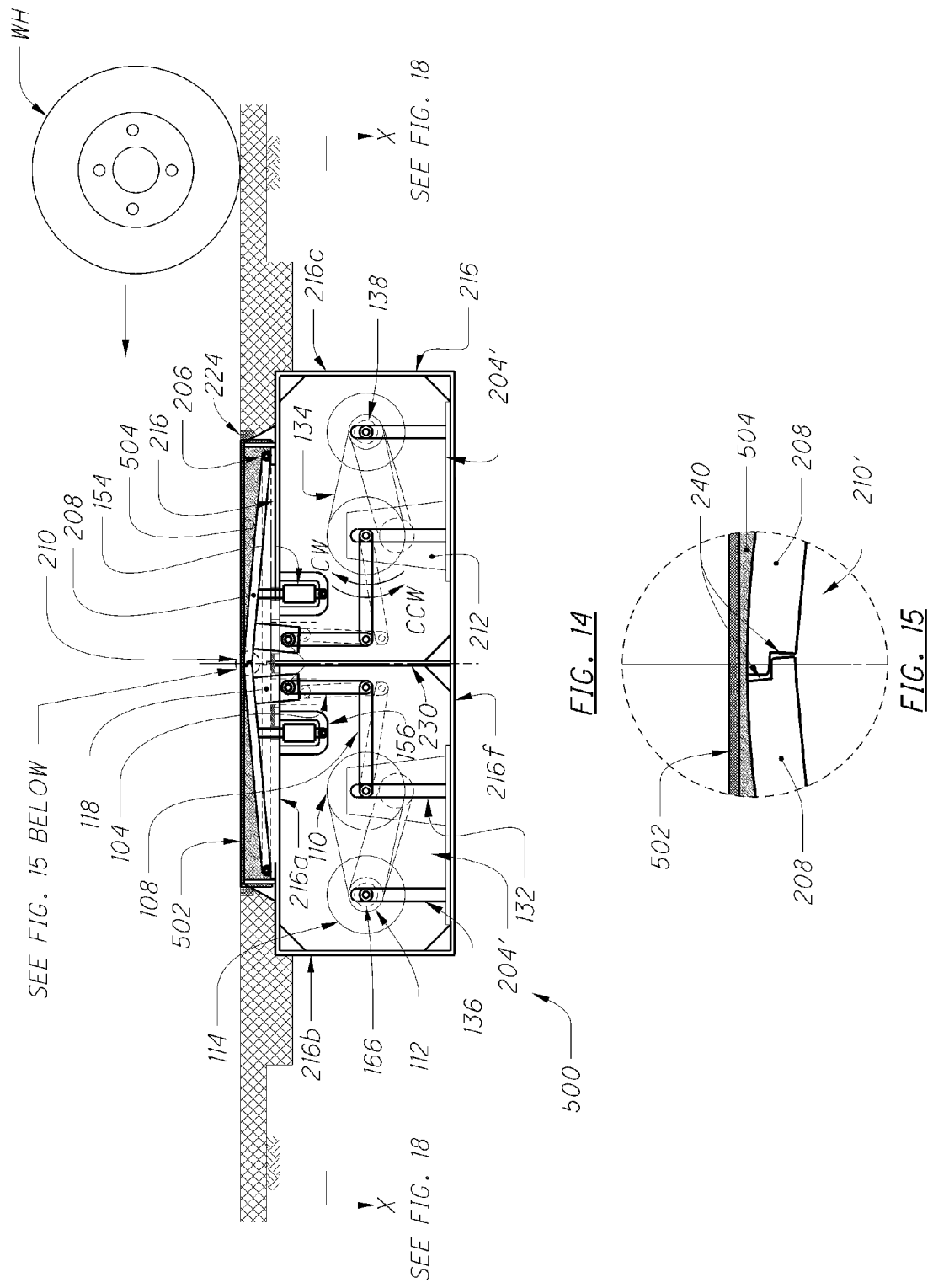

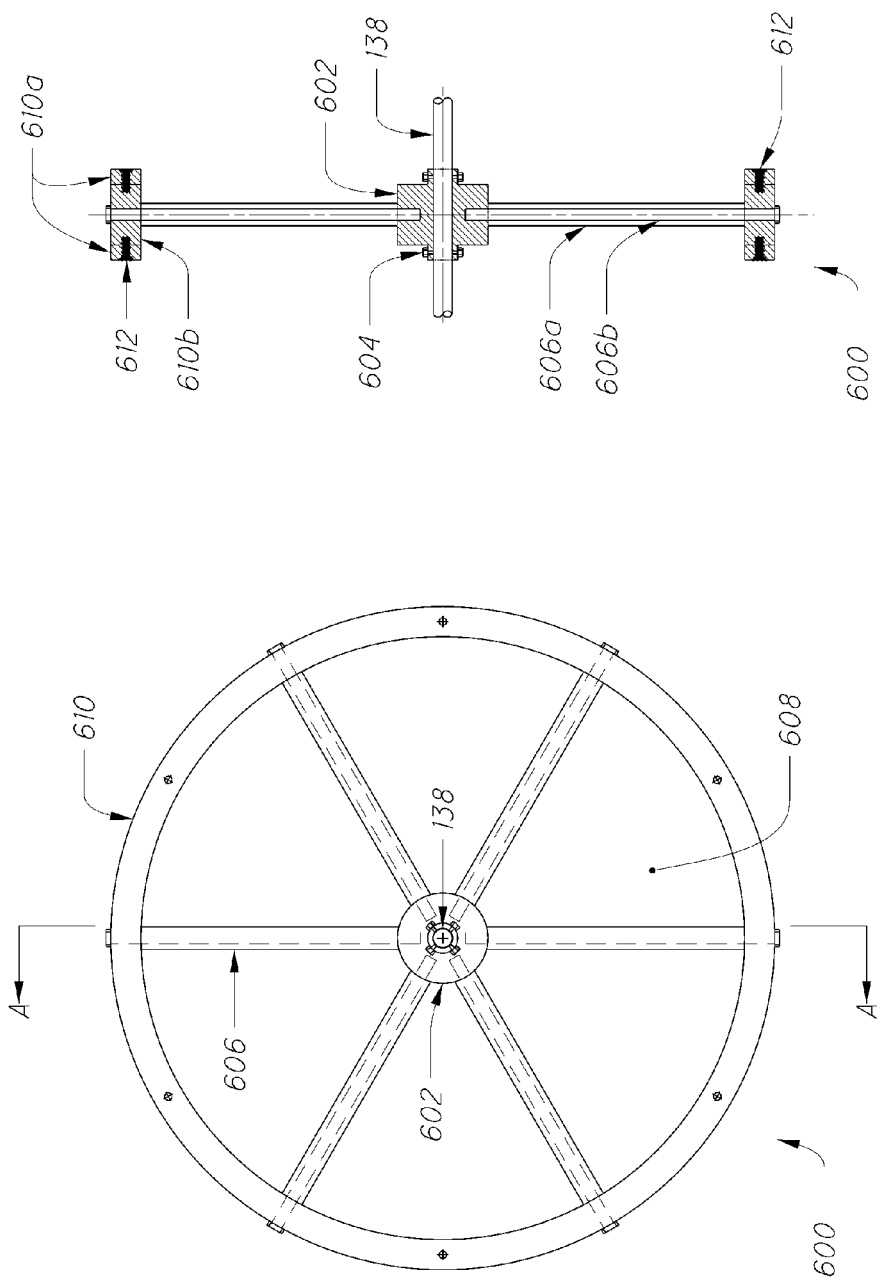

ELECTRICAL GENERATOR APPARATUS, PARTICULARLY FOR USE ON A VEHICLE ROADWAY

CROSS-REFERENCE TO RELATED APPLICATIONS

This is a continuation-in-part of U.S. patent application Ser. No. 13/429,243, filed Mar. 23, 2012, which is a continuation-in-part of U.S. patent application Ser. No. 13/075,245, filed Mar. 30, 2011, which claims the benefit of U.S. Provisional Patent Application No. 61/463,477, filed on Feb. 17, 2011, the disclosure of each of which is hereby incorporated by reference as if set forth in their entirety herein.

BACKGROUND OF THE INVENTION

1. Field of the Invention

The invention generally relates to electrical generating apparatuses. More particularly, the invention relates to an electrical generator apparatus that is designed to capture the otherwise wasted kinetic energy of moving vehicles travelling on a roadway, thereby resulting in the more efficient use of energy resources. The present invention materially contributes to the efficient utilization and conservation of petroleum-based energy resources by making better use of the energy consumed by vehicles.

2. Background and Related Art

In recent years, there has been a worldwide focus on the more efficient utilization and conservation of energy resources. Fossil fuels, such as coal, oil, and natural gas, take thousands of years to form naturally, and thus, cannot be replaced nearly as fast as they are being consumed. It is well known that gas-driven automobiles are one of the largest consumers of oil in the world. While automotive manufacturers are actively developing technologies that are designed to increase the fuel efficiency of their vehicles (e.g., hybrid gas-electric vehicles), these technologies typically overlook one important source of additional energy, namely the energy that can be produced by the interaction between the vehicles and the roadway on which they travel.

In the major countries throughout the world, including the United States, the automobile is the primary means of transportation. The automobiles in these countries travel along a network of roadways so that their occupants can be transported from one location to another. These roadways, particularly those disposed in and around large cities, carry a relatively steady stream of traffic during a significant portion of each day. Because the vehicles travel along these roadways at considerable speeds, they possess a great deal of potential energy that can be converted into kinetic energy for producing useful work. For example, the energy produced by the kinetic energy of moving vehicles advantageously could be used for powering roadway lighting systems, toll booths, and rest stops along an interstate highway. Unfortunately, in the past, this vast source of free, sustainable energy from moving vehicles has rarely been utilized.

While others have designed different systems for extracting kinetic energy from moving vehicles, the related art devices have numerous limitations and drawbacks. It is highly probable that the underutilization of the unused kinetic energy of moving vehicles can be attributed to the limitations present in the related art. For example, some of these traffic-actuated systems employ complex fluid-based systems that are expensive and difficult to implement. In addition, these fluid-based systems are not easy to maintain once they are installed within the roadway. Other traffic-actuated systems of the related art employ elements that substantially deviate from the general contour of the roadway, and thus, disturb the natural flow of traffic by creating significant vehicle vibrations, as well as potentially creating a great deal of unrest when motorists pass thereover. Some of these related art systems use geometric shapes that resemble speed bumps. While such systems could be utilized in areas where only low speeds are generally encountered, such as parking lots, it is obvious that these systems would be unsuitable for any roadways on which vehicles are travelling at a high rate of speed, such as a freeway or highway, where the potential for harvesting energy produced by moving vehicles is the greatest. Still other traffic-actuated systems taught by the related art utilize an arrangement of components that are readily susceptible to fatigue failure. Some of these related art systems use a plurality of meshed gears to harvest the kinetic energy imparted on the roadway by the moving vehicle. Because these gears will be subjected to millions of cycles in a region of high traffic, the gear teeth disposed on the outer surface thereof will likely undergo failure.

Thus, there is a great need for an electrical generator apparatus, which is particularly for use on a vehicle roadway, that utilizes a simple and easily serviceable arrangement of components, readily integrates into a typical roadway without substantially disrupting the general contour thereof, and employs a plurality of components that are less susceptible to fatigue failure.

BRIEF SUMMARY OF THE INVENTION

Accordingly, the present invention is directed to an electrical generating apparatus, which is designed for use on a vehicle roadway, that substantially obviates one or more problems resulting from the limitations and deficiencies of the related art.

In accordance with one or more embodiments of the present invention, there is provided an electrical generator system configured to convert an external actuation force applied by a vehicle traveling on a roadway into electrical energy, the electrical generator system including at least one electrical generator apparatus and a maintenance access assembly disposed adjacent to the at least one electrical generator apparatus, the maintenance access assembly including a plurality of bounding walls defining a maintenance passageway for gaining service access to the at least one electrical generator apparatus, the maintenance access assembly further including an access manhole disposed in an upper one of the plurality of bounding walls and above the maintenance passageway so as to facilitate access to the maintenance passageway. The at least one electrical generator apparatus includes a rotatable top portion adapted to receive the external actuation force applied by the vehicle traveling on the roadway; at least one linkage member, the rotatable top portion being operatively coupled to the at least one linkage member; a first wheel operatively coupled to the at least one linkage member without the use of gears; a second wheel operatively coupled to the first wheel via a tangential coupling element, the second wheel being configured to rotate at a higher angular velocity than the first wheel; a rotatable shaft operatively coupled to the second wheel; at least one flywheel operatively coupled to the rotatable shaft; and at least one electrical generator operatively coupled to the rotatable shaft, the at least one electrical generator adapted to convert a rotational movement of the rotatable shaft into electrical energy.

In a further embodiment of the present invention, the at least one linkage member of the at least one electrical generator apparatus comprises a plurality of linkage members, the rotatable top portion and the first wheel being operatively coupled to the plurality of linkage members. In this further embodiment, when the external actuation force is applied by the vehicle travelling on the roadway, one of the plurality of linkage members undergoes substantially translational movement and another one of the plurality of linkage members undergoes oscillatory movement.

In yet a further embodiment, the rotatable top portion of the at least one electrical generator apparatus comprises a first end region and a second end region, the first end region of the rotatable top portion being rotatably connected to a support, and the second end region of the rotatable top portion being operatively coupled to the at least one linkage member by means of a downwardly protruding portion.

In still a further embodiment, the rotatable top portion of the at least one electrical generator apparatus further comprises an upper layer of fiber reinforced polymer (FRP); and a lower support structure disposed underneath the upper layer of fiber reinforced polymer (FRP).

In yet a further embodiment, the rotatable top portion of the at least one electrical generator apparatus further comprises a preformed polymer cover; a compressible filler material disposed underneath the preformed polymer cover; and a lower support structure disposed underneath the compressible filler material. In this further embodiment, the lower support structure is operatively connected to the at least one linkage member by means of a downwardly protruding portion.

In still a further embodiment, the tangential coupling element of the at least one electrical generator apparatus comprises one of: (i) a chain and (ii) a belt.

In yet a further embodiment, the at least one flywheel of the at least one electrical generator apparatus comprises two or more flywheels.

In still a further embodiment, a shaft of the at least one electrical generator is offset with respect to the rotatable shaft, and the shaft of the at least one electrical generator is operatively connected to the rotatable shaft via an additional tangential coupling element.

In yet a further embodiment, the maintenance passageway of the maintenance access assembly comprises a floor, the floor of the maintenance passageway being disposed at a lower elevation relative to the ground than a bottom wall of a housing containing the at least one electrical generator apparatus so as to provide increased headroom height for servicing of the at least one electrical generator apparatus.

In still a further embodiment, the at least one electrical generator apparatus comprises a pair of electrical generator apparatuses, and the maintenance passageway of the maintenance access assembly is disposed between a first one of the pair of electrical generator apparatuses and a second one of the pair of electrical generator apparatuses.

The electricity generated by the present invention can be used for powering devices, such as roadway lights, that would otherwise consume electrical power supplied by a conventional power grid. Thus, the demand load of the conventional power grid is reduced, which in turn, reduces energy resources that are consumed by the conventional power plant that supplies electricity to the conventional power grid. Accordingly, the electrical generator apparatus of the present invention materially contributes to the efficient utilization and conservation of energy resources by making more efficient use of the fuel that is consumed by vehicles, and by reducing the demand load of conventional power plants. By harnessing the kinetic energy of moving vehicles, the present invention advantageously provides a valuable, additional source of electrical power that would otherwise be unutilized.

In addition, the electrical generator apparatus described herein is an alternative, sustainable means of energy production. Unlike a conventional power plant, the electrical generator apparatus of the present invention is a "clean" technology that does not emit harmful waste products into the atmosphere as a byproduct of the power generation process. Consequently, the present invention also contributes to a reduction in greenhouse gas emissions by reducing harmful waste products that would otherwise by emitted from conventional power plants, which predominantly burn fossil fuels to generate electricity.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a sectional side view of the electrical generator apparatus according to a second embodiment of the invention, which is denoted by cutting-plane line W-W in FIG. 6;

FIG. 3 is an enlarged view of the ramp plate center hinge of the electrical generator apparatus according to the second embodiment of the invention;

FIG. 11 is a side view of one flywheel used in conjunction with the exemplary embodiments of the electrical generator apparatuses described herein;

FIG. 12 is a sectional view of one flywheel used in conjunction with the exemplary embodiments of the electrical generator apparatus described herein, which is denoted by cutting-plane line A-A in FIG. 11;

FIG. 14 is a sectional side view of the electrical generator apparatus according to a fourth embodiment of the invention, which is denoted by cutting-plane line W-W in FIG. 18;

FIG. 15 is an enlarged view of the ramp plate center hinge of the electrical generator apparatus according to the fourth embodiment of the invention;

FIG. 23 is a side view of another flywheel used in conjunction with the exemplary embodiments of the electrical generator apparatuses described herein; and FIG. 24 is a sectional view of another flywheel used in conjunction with the exemplary embodiments of the electrical generator apparatuses described herein, which is denoted by cutting-plane line A-A in FIG. 23.

Throughout the figures, the same parts are always denoted using the same reference characters so that, as a general rule, they will only be described once.

DETAILED DESCRIPTION OF THE PREFERRED EMBODIMENTS OF THE INVENTION

1. First Embodiment

Figure 1:
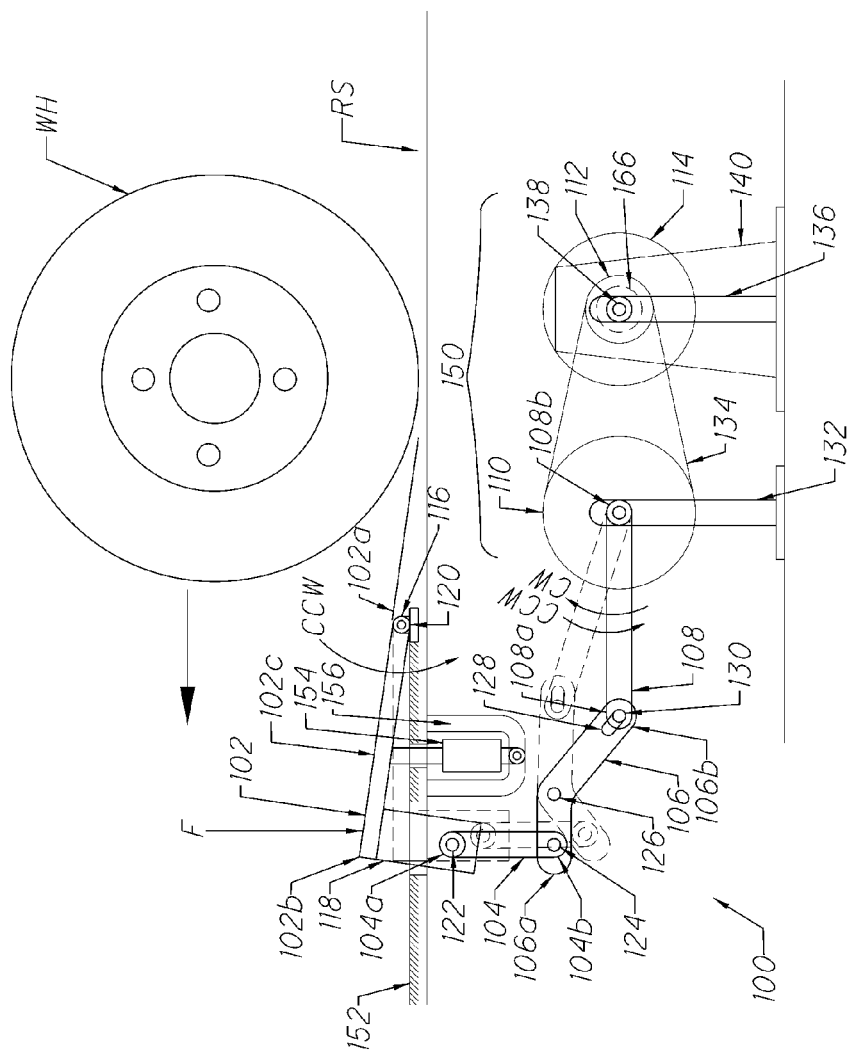
FIG. 1 is a side view of the electrical generator apparatus according to a first embodiment of the invention.

A first embodiment of an inventive electrical generator apparatus is seen generally at 100 in FIG. 1. In this embodiment, the electrical generator apparatus 100 generally comprises a rotatable top portion exemplified by rotatable lever portion 102, a first linkage member exemplified by plunger bar 104, a second linkage member exemplified by leverage bar 106, a third linkage member exemplified by crank 108, a first wheel 110, a second wheel 112, a flywheel 114, and an electrical generator 140. These components 102-140 are operatively coupled to one another such that electrical energy can be generated when an external actuation force F is applied to the rotatable lever portion 102 by a wheel WH of a vehicle traveling on a roadway surface RS. Each component of the system will be described in detail below.

In the first preferred embodiment of the invention, the rotatable lever portion 102 has a first end 102a, a second end 102b, and an upper surface 102c. At the first end 102a, the rotatable lever portion 102 is preferably rotatably connected to a support 116 located on the roadway surface RS via a pin 120. Conversely, at the second end 102b, the rotatable lever portion 102 is preferably fixedly attached to an upper edge of a plunger block 118. The lower portion of the plunger block 118 is rotatably coupled to a first end 104a of the plunger bar 104 via a pin 122. Thus, when an external actuation force F is applied to the upper surface 102c of the rotatable lever portion 102, the rotatable lever portion 102 rotates in a counter-clockwise direction CCW about a rotational axis disposed generally centrally through the pin 120. As a result of this motion, the second end 102b of the rotatable lever portion 102 and the plunger block 118 fixedly attached thereto undergoes a downward vertical displacement.

In the preferred embodiment depicted in FIG. 1, the rotatable lever portion 102 and the plunger block 118 are depicted as having generally rectangular geometries. However, it is to be understood that the rotatable lever portion 102 and the plunger block 118 could be formed using other geometric shapes without departing from the spirit of the invention, such as but not limited to, semi-circular shapes.

As seen in FIG. 1, the rotatable lever portion 102 is operatively connected to an upper end of a tube spring 154. The tube spring 154 extends vertically downward from the rotatable lever portion 102 to a lowermost end, which is pivotally mounted to a bottom member of a U-shaped tube spring support structure 156. The opposed, upper ends of U-shaped tube spring support structure 156 are attached to the bottom surface of a housing plate lying beneath the roadway surface RS. When the actuation force F is applied to the rotatable lever portion 102, the tube spring 154 is compressed and thus, undergoes elastic deformation. After the force F is no longer being applied to the rotatable lever portion 102 (i.e., when wheel WH is no longer pressing down on rotatable lever portion 102), the tube spring 154 urges the rotatable lever portion 102 back into its upward position. In order to prevent the rotatable lever portion 102 from loudly slamming against the top surface of the housing plate, a rubber pad 152 is disposed on the top surface thereof. Thus, when the bottom surface of the rotatable lever portion 102 contacts the top surface of the housing plate, an objectionable slamming noise can be avoided. In a preferred embodiment, the rubber pad 152 has a thickness of one-half (½) of an inch. However, one of ordinary skill in the art will readily appreciate that the rubber pad 152 can be formed using other thicknesses without departing from the spirit and scope of the invention.

The plunger bar 104, as depicted in the first embodiment, includes a first end 104a and a second end 104b. As described above, the first end 104a of the plunger bar 104 is preferably rotatably connected to a lower portion of the plunger block 118 via a pin 122. Conversely, the second end 104b of the plunger bar 104 is preferably rotatably connected to a first end 106a of the leverage bar 106 via a pin 124. When the plunger block 118 undergoes the abovedescribed vertical displacement, the plunger bar 104, which is pivotally attached to the plunger block 118, also undergoes a downward vertical displacement (as depicted by the dashed lines in FIG. 1). As it is vertically displaced, because the plunger bar 104 is not constrained about a stationary pivot of any type, it also undergoes a small horizontal displacement within a vertical reference plane oriented in the direction of traffic flow.

While the plunger bar 104 is depicted in FIG. 1 as having an elongated longitudinal geometry with rounded first and second ends 104a, 104b, those of ordinary skill in the art will readily understand that the plunger bar 104 can be formed using many different alternative geometries. For example, the ends 104a, 104b of the plunger bar 104 need not be rounded, rather the ends 104a, 104b could be formed using sharp corners (e.g., corners that form substantially 90-degree angles).

As seen in the first embodiment of FIG. 1, the leverage bar 106 includes a first end 106a and a second end 106b. As described above, the first end 106a of the leverage bar 106 is preferably rotatably connected to a second end 104b of the plunger bar 104 by virtue of pin 124. The second, opposite end 106b of the leverage bar 106 is operatively connected to a first end 108a of the crank 108 via a pin 130. When the plunger bar 104 is vertically displaced in the manner described above, the leverage bar 106 rotates in a counter-clockwise direction about a pin 126, which serves as a fixed pivot point for the leverage bar 106. As the leverage bar 106 rotates in the counter-clockwise direction, it rotates relative to crank 108, and pin 130 slides within an elongated slot 128 at the second end 106b of leverage bar 106. In the preferred embodiment, the ratio of the distance between the central axis of the pin 126 and pin 130 to the distance between the central axis of the pin 124 and pin 126 is between 2:1 and 4:1. However, one of ordinary skill in the art will readily appreciate that these ratios are merely exemplary, and that other ratios may be used without departing from the spirit of the invention.

While the leverage bar 106 is depicted in FIG. 1 as having a geometry that resembles that of a boomerang, those of ordinary skill in the art will readily understand that the leverage bar 106 can be formed using many different alternative geometries. For example, rather than employing an elongated geometry, the leverage bar 106 could be formed from a circular disk, or in the shape of an ellipse.

The crank 108 comprises a first end 108a and a second end 108b. As explained above, the first end 108a of the crank 108 is operatively connected to the second end 106b of the leverage bar 106. Conversely, the second end 108b of the crank 108 is fixedly attached to the central portion of the first wheel 110 such that crank 108 rotates together with the first wheel 110. In the preferred embodiment, the crank 108 is shown having a length that is substantially greater than the diameter of the first wheel 110. However, it is to be understood that this depicted length is merely given by way of example, and in no way is intended to be limiting. In other embodiments, the crank 108 has a length that is significantly less than the one shown in FIG. 1.

Advantageously, the first, second, and third linkage members 104, 106, 108 (plunger bar, leverage bar, and crank) are operatively coupled to one other without the use of any gears, cams, or clutches. Similarly, the rotatable lever portion 102 is operatively coupled to the first linkage member 104 without the use of any gears, cams, or clutches. Also, the electrical generator apparatus 100 of the present invention does not use any complex fluid or hydraulic systems of any type. Moreover, no magnetic or piezoelectric devices are employed in the electrical generator apparatus 100 of the present invention. Thus, the manufacturing and maintenance of the electrical generator apparatus 100 is simplified, and it is less susceptible to fatigue failure as compared to other systems that employ gears and cams.

Next, the electrical power generation sub-assembly 150 of FIG. 1 will be described in detail. The electrical power generation sub-assembly 150 generally comprises a first wheel 110, a second wheel 112, a tangential coupling element 134 coupling the first wheel 110 to the second wheel 112, a flywheel 114 operatively coupled to the second wheel 112 via an output shaft 138, and an electrical generator 140 operatively coupled to the second wheel 112 and the flywheel 114 via the output shaft 138. The tangential coupling element 134 may take the form of a belt, a chain, or any other coupling device that is capable transferring the rotational motion of the first wheel 110 to the second wheel 112 with minimal slippage. The first wheel 110 and the second wheel 112 are preferably structurally supported on a first support structure 132 and a second support structure 136, respectively.

A detailed depiction of an exemplary flywheel 114 is shown in FIGS. 11 and 12. At its approximate geometric center, the flywheel 114 has a hub 158, which operatively connects the flywheel 114 to the output shaft 138. The flywheel 114 has a body portion 160 located radially outward from the hub 158. The body portion 160 is provided with a plurality of apertures 162 provided therethrough in order to minimize the weight of the body portion 160, as well as to reduce the amount of material that is required to form the body portion 160, which desirably reduces its manufacturing cost. In other embodiments, the flywheel 114 could be provided with a plurality of spokes or arms in lieu of the body portion 160. At its outer periphery, the flywheel 114 contains a rim portion 164. As best seen in the sectional view of FIG. 12, the rim portion 164 has a thickness in the axial direction that is substantially greater than that of the body portion 160. This is the preferred design for the flywheel 114 because it concentrates the bulk of the flywheel mass in the portion of the flywheel 114 that has the largest radii. The mass at the largest radius of the flywheel 114 contributes much more to its mass moment of inertia because the mass moment of inertia is proportional to: $mr^2$ (mass multiplied by the square of the radius). Thus, concentrating the majority of the flywheel mass in the portion of the flywheel having the largest radii, results in a more efficient use of the material(s) that are used to form the flywheel 114.

An exemplary electrical generator 140 is a conventional direct current (DC) generator having a mechanical input shaft, electrical output wires, and a plurality of internal components encased within a metal housing. The main internal components of the electrical generator 140 include, but are not limited to, the following: a magnetic frame or yoke, pole coils or field coils, armature windings or conductors, brushes and bearings, pole cores and pole shoes, an armature core, and a commutator. Because the structure and functionality of conventional DC generators are well known in the electromechanical arts, an extensive discussion of electrical generator 140 is not necessary in the present disclosure.

As shown in FIG. 1, the electrical power generation sub-assembly 150 further includes a freewheel or overrunning clutch 166 that disengages the output shaft 138 from the second wheel 112 when the output shaft 138 rotates faster than the second wheel 112 so that the output shaft 138 is able to freely and continually rotate independent from the second wheel 112. Rather than employing a freewheel 166, the electrical power generation sub-assembly 150 could alternatively utilize a freehub for enabling the independent rotation of the output shaft 138. Because the operation of freewheels, overrunning clutches, and freehubs are well known in the mechanical arts, a detailed discussion of their operation is not necessary in the disclosure at hand.

Now, the operation of the electrical generator apparatus 100 will be explained. As the wheels WH of vehicles traveling on the roadway surface RS pass over the rotatable lever portion 102, they will exert a generally downward actuation force F on the upper surface 102c thereof. In response to the application of this force F, the rotatable lever portion 102 will rotate in a counter-clockwise direction that will, in turn, displace the plunger block 118 that is attached to the second end 102b of the rotatable lever portion 102 in a generally downward direction (see dashed lines in FIG. 1). The downward movement of the plunger block 118 will cause the plunger bar 104 to be displaced in a similar downward fashion (as depicted by the dashed lines). In response to the displacement of the plunger bar 104, the leverage bar 106 will rotate in a counter-clockwise direction about fixed pivot (pin 126). Thus, the first end 106a of the leverage bar 106 will be downwardly displaced, while its second end 106b containing elongated slot 128 will be upwardly displaced (see dashed lines in FIG. 1). Because the crank 108 is operatively coupled to the leverage bar 106, the upward displacement of the second end 106b of the leverage bar 106 will result in a consequential upward displacement of the first end 108a of the crank 108 and a clockwise rotation of the crank 108 (refer to dashed lines in FIG. 1). The first wheel 110, which is fixedly secured to the crank 108, will also rotate in a clockwise direction together with tangential coupling element 134, which is attached to the periphery thereof. The clockwise rotational movement of the tangential coupling element 134 will, in turn, drive the second wheel 112 in a clockwise direction. Because the second wheel 112 has a diameter that is significantly smaller than the diameter of the first wheel 110, the second wheel 112 will rotate at a substantially higher angular velocity, and revolutions per minute (RPM), as compared to the first wheel 110. This will help maximize the power generated by this system. As described above, the second wheel 112 is operatively coupled to a flywheel 114 and an electrical generator 140 via the output shaft 138. Thus, the rotation of the second wheel 112 will be transmitted to both the flywheel 114 and the electrical generator 140. The flywheel 114, which has a substantial moment of inertia, is used as a storage device for storing rotational energy. In particular, the flywheel 114 helps to maintain the continual rotation of the output shaft 138 during the periods when vehicles are not applying the external actuation force F on the upper surface 102c of the rotatable lever portion 102. Thus, the generator is able to deliver electrical power on a more consistent basis during the operation of the system.

In the paragraph above, the downward stroke of the electrical generator apparatus 100 was described in detail. However, it is to be understood that the electrical generator apparatus 100 undergoes cyclical motion and thus, when components 102, 104, and 118 reach the lowermost limit of the downward stroke (as indicated by the dashed lines in FIG. 1), components 102, 104, 106, 108, and 118 begin to move in the opposite direction, and the upward stroke of the electrical generator apparatus 100 commences. In a preferred embodiment, the tube spring 154, which is compressed when the actuation force F is applied to the rotatable lever portion 102, is used to urge the components 102, 104, and 118 in an upward direction during the upward stroke of the electrical generator apparatus 100. However, one of ordinary skill in the art will readily understand that other devices may be utilized in lieu of a tube spring such as, for example, a coil spring mounted around the outer periphery of pin 120. When installed on a roadway surface RS, the upward stroke of the electrical generator apparatus 100 occurs when the actuation force F is not being applied to the upper surface 102c of the rotatable lever portion 102 (i.e., when the tire(s) of the vehicle are not contacting the upper surface 102c of the rotatable lever portion 102).

2. Second Embodiment

A second embodiment of an inventive electrical generator apparatus is seen generally at 200 in FIGS. 2 and 4-6. In some respects, the second embodiment is similar to that of the first embodiment. Moreover, some parts are common to both such embodiments. For the sake of brevity, the parts that the second embodiment of the electrical generator apparatus 200 has in common with the first embodiment of the electrical generator apparatus 100 will not be described in conjunction with the second embodiment because these components have already been explained in detail above. Furthermore, in the interest of clarity, these components will be denoted using the same reference characters that were used in the first embodiment.

However, it is evident from FIGS. 2 and 4-6 that the second embodiment of the electrical generator apparatus 200 also differs in several important respects from that of the first embodiment of FIG. 1. The unique features of the second embodiment will be explained in detail below. One of ordinary skill in the art will readily appreciate that the constituent parts of the first and second embodiments may be readily combined with one another without departing from the spirit and the scope of this invention.

First, turning to FIG. 2, one can see that the upper end of each plunger block 118 is operatively coupled to a corresponding ramp plate that includes a fiber reinforced polymer (FRP) panel section 202, rather than the rotatable lever portion 102 depicted in FIG. 1. The FRP panel section 202 is particularly well-suited for use on a roadway because it has a high strength-to-weight ratio, and it is corrosion resistant, impact resistant, and easy to maintain. In addition, it is more cost effective than the other materials that are suitable for this application. As shown in FIG. 2, each FRP panel section 202 is structurally supported on a panel support structure 208, which is pivotally mounted about a ramp plate hinge 206. The ramp plate hinge 206 allows a portion of the FRP panel sections 202 to rotate in manner similar to that of the rotatable lever portion 102 described in conjunction with the first embodiment. FIG. 2 depicts two FRP panel sections 202 and corresponding panel support structures 208 inclined upwardly toward one another. The panel support structures 208 come together in a semi-interlocking fashion at a ramp plate center hinge 210.

A detailed view of the ramp plate center hinge 210 is illustrated in FIG. 3. As seen in this figure, when the ramp plates are in the raised position, the complementary edges 240 of the two inclined panel support structures 208 are provided with a slight clearance therebetween so that the panel support structures 208 do not interfere with the downward movement of the ramp plates when the vehicle wheels WH are passing thereover. In a preferred embodiment, the surfaces of the edges 240 are provided with a durable coating, such as Teflon®. While a particular geometry has been depicted for the edges 240 of the panel support structures 208, it is to be understood that the edges 240 can be formed using other geometric configurations so long as the geometry of the edges 240 does not impede with the downward movement of the ramp plates.

In a preferred embodiment, the ramp plates have a slope of approximately 10:1 horizontal-to-vertical or less in the raised position (solid line position) depicted in FIG. 2. When a vehicle passes over the ramp plates, they rotate downwardly and become substantially flat when the weight of the passing vehicle is applied thereto. Consequently, the vertical vibration experienced by the occupants of the passing vehicle is significantly less than that encountered when riding over a rigid ramp with the same profile design. Although a slope of approximately 10:1 or less is preferred to minimize vehicle vibrations, it is to be understood that other slopes may be used for the ramp plates without departing from the spirit and the scope of the invention.

In one embodiment, the panel support structure 208 is in the form of a one (1) inch thick steel plate. However, one of ordinary skill in the art will readily appreciate that the panel support structure 208 can be formed in many different ways. For example, rather than using a steel plate that is one (1) inch thick, one could utilize a thinner steel plate and provide the thinner plate with stiffeners in order to increase its strength and rigidity.

As seen in FIG. 2, each panel support structure 208 is operatively connected to an upper end of a tube spring 154. The tube spring 154 extends vertically downward from the panel support structure 208 to a lowermost end, which is pivotally mounted to the bottom member of a U-shaped tube spring support structure 156. The opposed, upper ends of U-shaped tube spring support structure 156 are attached to the bottom surface of the top plate of housing 216. The functionality of the tube spring 154 is virtually the same as that described above for the first embodiment.

In a preferred embodiment, the outer portions of each FRP panel section 202 are structurally supported using high strength (6,000 psi) mortar 218 (see FIG. 2). This helps to ensure the structural integrity of the electrical generator apparatus 200 when large vehicles are passing over the apparatus 200. This is especially important when large, extremely heavy tractor trailers are passing over the electrical generator apparatus 200 on a highway installation.

Figure 6:
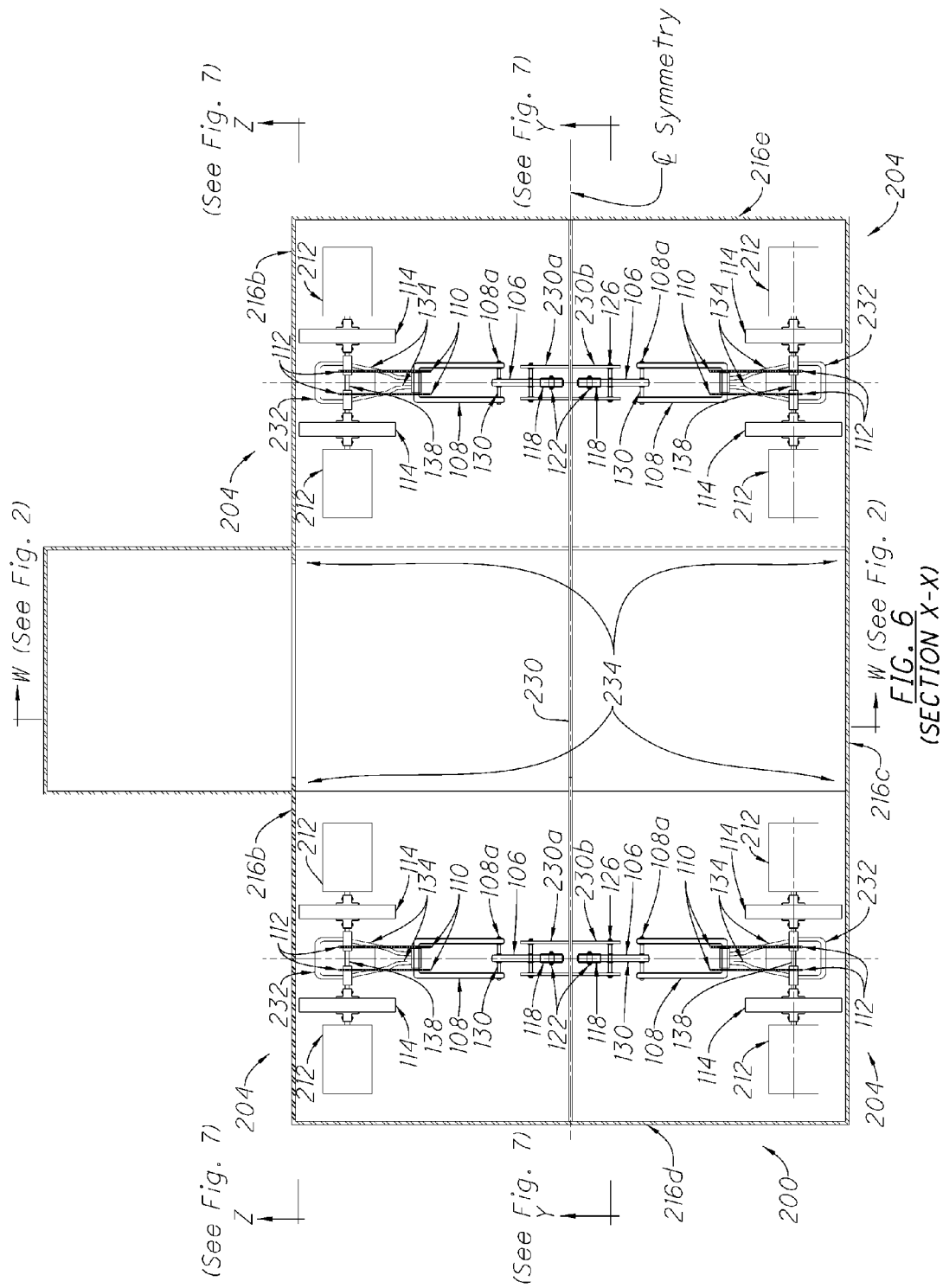
FIG. 6 is yet another top view of the electrical generator apparatus according to the second embodiment of the invention, but with the top plate of the housing removed, which is denoted by cutting-plane line X-X in FIG. 2.
Figure 7:
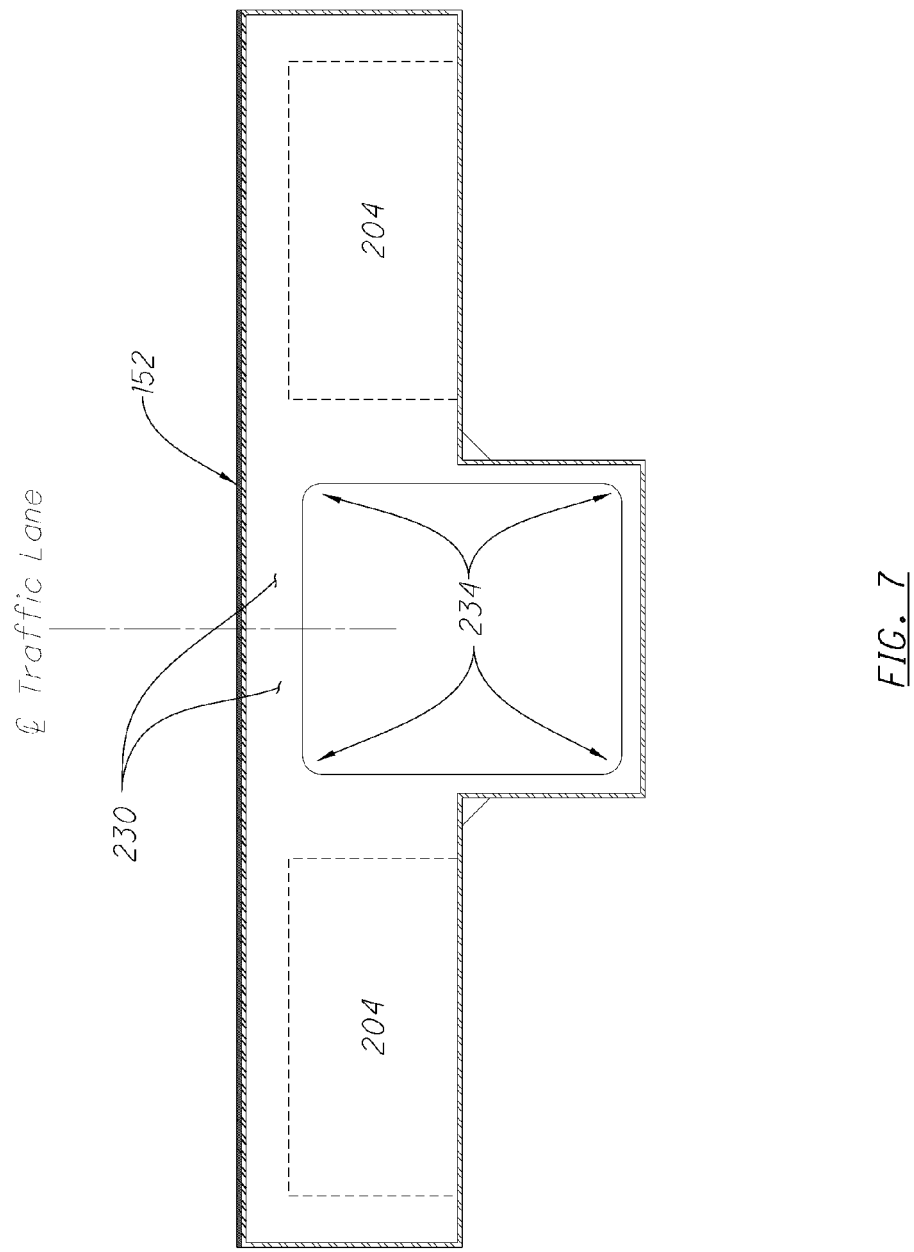
FIG. 7 is a sectional side view of the electrical generator apparatus according to the second embodiment of the invention, which is denoted by cutting-plane lines Y-Y and Z-Z in FIG. 6, depicting the maintenance access passageway.

As can be seen in FIGS. 2 and 6, the second embodiment of the electrical generator apparatus 200 comprises a first plurality of electrical generator sub-assemblies 204 arranged in mirrored relationship to a second plurality of electrical generator sub-assemblies 204. This arrangement of electrical generator sub-assemblies 204 enables the power output generated therefrom to be maximized. As best shown in FIG. 6, the generators 212 of the first plurality of electrical generator sub-assemblies 204 are substantially aligned in the horizontal (left-to-right) direction along centerlines. Similarly, the generators 212 of the second plurality of electrical generator sub-assemblies 204 are substantially aligned in the horizontal (left-to-right) direction along centerlines, which are spaced apart from, and generally parallel to, the centerlines of the first plurality of electrical generator sub-assemblies 204. Moreover, it can be seen that each electrical generator sub-assembly 204 contains two generators 212 mounted on output shaft 138 in an opposed relationship to one another. On the inner side of each of these two generators 212, and secured to output shaft 138, are mounted two flywheels 114 for energy storage purposes (as described above). While the arrangement of FIG. 6 depicts the generators 212 of each respective first and second plurality of electrical generator sub-assemblies 204 being substantially aligned with one another, one of ordinary skill in the art will readily appreciate that other configurations are possible. For example, the electrical generators 212 of each sub-assembly 204 could be arranged in a staggered relationship with respect to one another in the longitudinal direction (i.e., in the left-to-right direction of FIG. 6).

Figure 4:
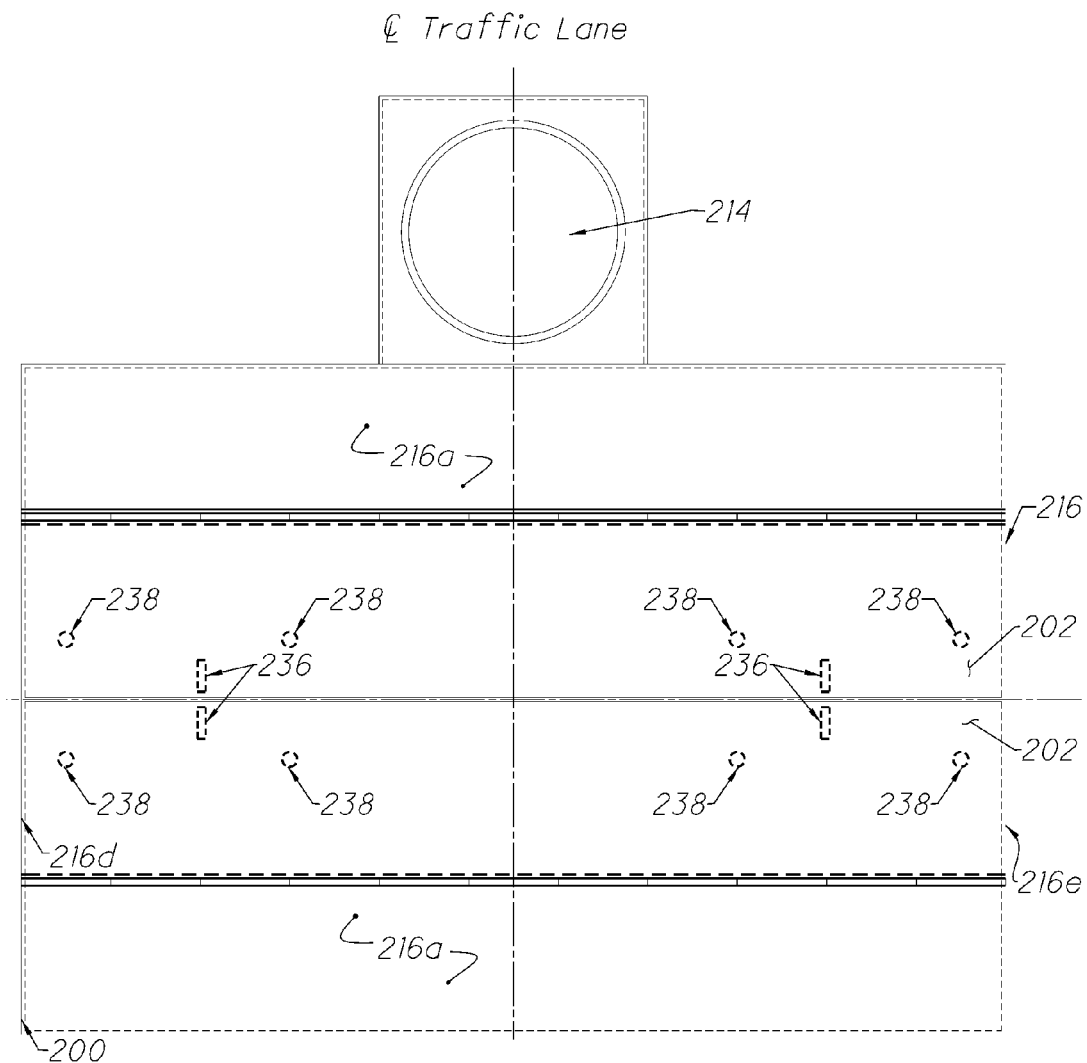
FIG. 4 is a top view of the electrical generator apparatus according to the second embodiment of the invention with the ramp plates shown on the top of the housing.
Figure 5:
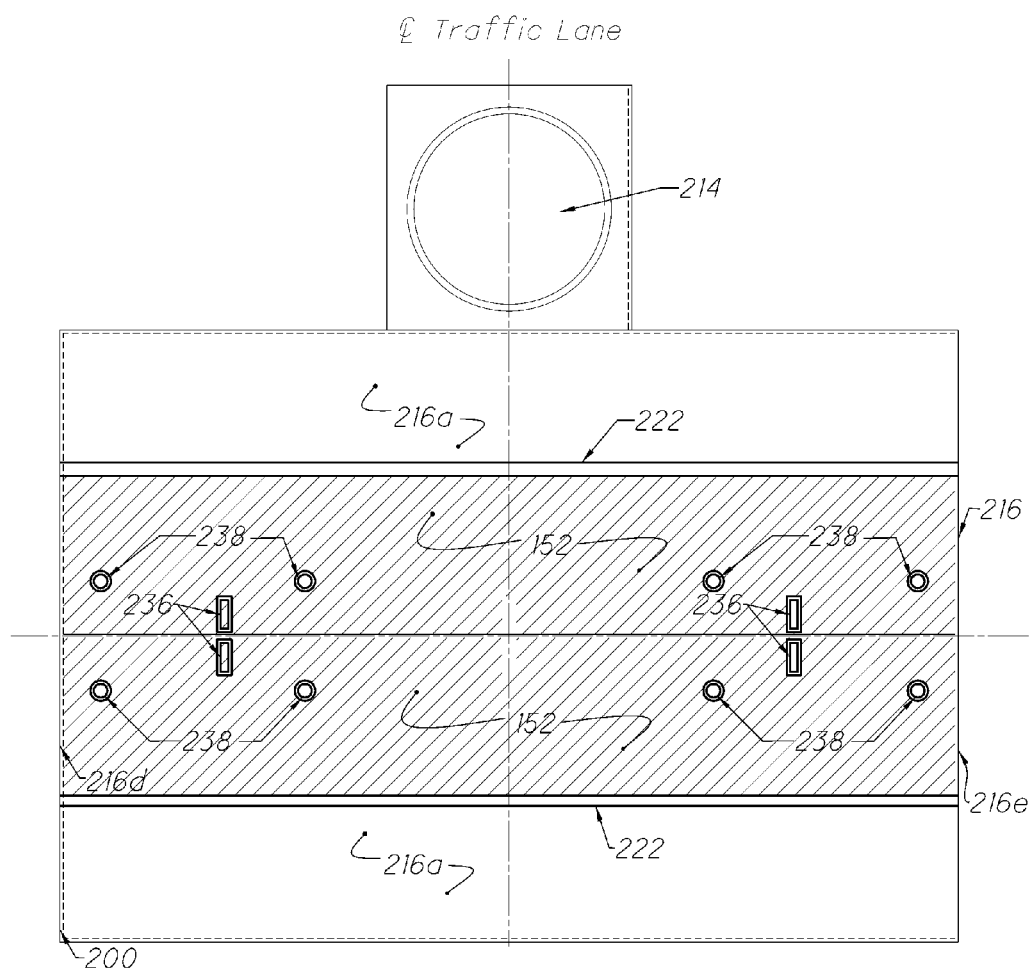
FIG. 5 is another top view of the electrical generator apparatus according to the second embodiment of the invention with the ramp plates removed from the housing.

Now, with reference to FIGS. 2, 4, 5, and 6, the structure of housing 216 will be described. As shown in these figures, the first and second pluralities of electrical generator sub-assemblies 204 are enclosed within a housing 216. The housing 216 generally comprises a top plate 216a, side plates 216b, 216c, end plates 216d, 216e, and a bottom plate 216f. The top plate 216a of the housing 216 is best shown in FIGS. 4 and 5, which respectively depict the top of the housing 216 with the ramp plates shown, and the ramp plates removed. As seen in these two figures, the top plate 216a contains two sets of apertures for accommodating the passage of components therethrough. The apertures are shown dashed in FIG. 4 because they are located underneath the ramp plates, while they are shown solid in FIG. 5 because the ramp plates have been omitted in this figure. The first set of apertures comprises four (4) elongated slots 236, each designed for accommodating one of the plunger blocks 118. The elongated slots 236 are all sized to be slightly larger than the cross-sectional area of each plunger block 118 so that each plunger block is able to freely move in a substantially vertical direction without interfering with the top plate 216a of the housing 216. The second set of apertures comprises eight (8) circular openings 238, each designed for accommodating one of the tube spring 154 shafts. Similar to the elongated slots 236, the circular openings 238 are all sized to be slightly larger than the cross-sectional area of the component that they receive. In this case, each circular opening 238 is sized to be slightly larger than the shaft of each tube spring 154. Thus, the shaft of each tube spring 154 is able to freely move in a substantially vertical direction without coming into contact with the top plate 216a of the housing 216.

As best seen in FIG. 5, similar to the first embodiment of the invention, a rubber pad 152 is disposed on the top surface of the top housing plate 216a between the bases 222 of each ramp plate hinge 206 so as to prevent the rotatable ramp plates from loudly slamming against the top surface of the housing plate 216a. Thus, when the bottom surface of the panel support structure 208 comes into contact with the top surface of the housing plate 216a, an objectionable slamming noise can be avoided. In a preferred embodiment, the rubber pad 152 has a thickness of one-half (½) of an inch, but those of ordinary skill in the art will appreciate that other thicknesses may also be used without departing from the spirit of the invention.

Also, in a preferred embodiment, the top and bottom corners of the housing 216 are provided with corner stiffeners 220 (see FIG. 2). Solely for the purpose of illustration, and not of limitation, the housing 216 can be formed from one-half (½) inch thick steel plates, while the corner stiffeners 220 can be 1"×3"×3" corner stiffeners. However, one of ordinary skill in the art will readily appreciate that the housing 216 can be formed using plates with other thicknesses and from other materials and that similarly, other sizes of corner stiffeners 220 can be used without departing from the spirit and scope of the invention.

While not explicitly shown in the drawings, the housing 216 of the electrical generator apparatus 200 can be flanked on opposite sides by electrical wiring conduits. After leaving the electrical generator apparatus 200, the wiring from the generators 212 can be routed in the electrical wiring conduits to an electrical storage device (e.g., a battery array) and/or devices that require electrical power (e.g., street lights). In a preferred embodiment, the electrical wiring conduits are mounted in class "S" type concrete. Class "S" type concrete is highly desirable for use in such an application because it is very strong, and has a compressive strength (f'c) of 4,500 psi.

In FIG. 2, it is seen that the gap between the outer, upper edge of the housing 216 and the adjacent roadway pavement 228 is ideally filled with a joint sealer 224 so as to prevent the separation of the electrical generator apparatus 200 from the existing roadway pavement 228. In addition, the joint sealer 224 also provides a benefit from the standpoint of waterproofing, namely the joint sealer 224 inhibits or prevents the passage of moisture in the gap between the housing 216 and the existing roadway pavement 228 adjacent thereto. Even though not explicitly shown in the figures, one of ordinary skill in the art will readily appreciate that the other sides of the housing 216 can be provided with a joint sealer 224 completely therearound for the purposes herein described.

Referring again to FIG. 2, the output shaft 138 is seen to be operatively connected to the second wheel 112. Also, as described above with regard to the first embodiment, the second wheel 112 is operatively coupled to the first wheel 110 via a tangential coupling element 134. In the second embodiment, as depicted in FIG. 6, it can be seen that first wheel 110, second wheel 112, and output shaft 138 are mounted on a wheel support frame 232. It is to be understood that the geometry of the wheel support frame 232 depicted in FIG. 6 is merely exemplary in nature, and that many other geometric configurations of the wheel support frame 232 can be used without departing from the spirit of the invention described herein.

In FIG. 6, it can be seen that the crank 108, which is operatively connected to the first wheel 110, has a U-shaped geometry. While it is to be understood that this particular geometric configuration of the crank 108 is in no way limiting and that other geometric configurations are explicitly contemplated herein (e.g., the crank could merely be a simple longitudinally-extending bar), the beneficial aspects of this particular geometric configuration are worth noting. For example, as shown in FIG. 6, the U-shaped geometry of the crank 108 enables two first wheels 110 to be placed next to one another, each on an opposing side of the wheel support frame 232. This additional first wheel 110 would be advantageously coupled to an additional second wheel 112 via an additional tangential coupling element 134. This particular arrangement of the electrical generator sub-assembly 204 could have numerous benefits, such as reducing the fatigue stress on the tangential coupling element 134.

As described above with regard to the first embodiment, the crank 108 is operatively connected to the leverage bar 106 at its first end 108a. Similarly, the pivotal motion of the leverage bar 106 about fixed pivot pin 126 was heretofore described. However, the manner in which the pivot pin 126 is structurally supported was not described in conjunction with the first embodiment, so it will be described here. As best depicted in FIG. 2, a central support structure 230 is provided between the first and second pluralities of electrical generator subassemblies 204, which are provided in mirrored relationship to one another. In order to provide a mounting surface for each pivot pin 126, lateral sides of the center support structure 230 are provided with opposing mounting plates 230a, 230b. Each of these mounting plates 230a, 230b accommodates one pivot pin 126. In addition to providing a support structure for the pivot pins 126, the central support structure 230 also advantageously structurally supports the top plate 216a of the housing 216. After all, the top plate 216a supports a vast amount of weight, particular when vehicles are passing over the top of the electrical generator apparatus 200.

In a preferred embodiment, the overall width of the electrical generator apparatus 200 is approximately 11'-0" (i.e., in the longitudinal direction of the housing side plates 216b, 216c). This overall width of approximately 11'-0" is sized in accordance with the typical width for a lane of traffic. While the U.S. Highway System uses a 12-foot (3.7 m) standard lane width, lanes having a 11-foot (3.4 m) width are found to be acceptable by the Federal Highway Administration for automobile traffic. However, it is to be understood that this dimension is merely given by way of example, and in no way is intended to be limiting. Thus, it is readily appreciated that, in other embodiments, the electrical generator apparatus 200 can have a width different than 11'-0".

Now, maintenance access to the electrical generator apparatus 200 will be described with reference to FIGS. 2 and 4-7. In general, service access to the electrical generator apparatus 200 will be achieved using an access manhole 214 and associated passageway 234. In particular, as best shown in FIGS. 2, 4, and 5, the manhole 214 will be placed at a predetermined location in the existing roadway pavement 228 that surrounds the housing 216, preferably adjacent to the housing 216 (see e.g., FIG. 2). A first vertical portion of the passageway 234 is provided beneath the manhole 214. And, as best shown in FIG. 6, a second horizontal portion of the passageway 234 extends through side 216b of the housing 216, and between a plurality of electrical generator subassemblies 204. The passageway 234 allows a service technician to gain access to the components of the electrical generator apparatus 200, such as the generators 212. As most clearly illustrated in FIG. 7, the horizontal portion of the passageway 234 has a height that is significantly greater than the portions of the housing 216 in which the electrical generator subassemblies 204 (schematically represented in FIG. 7) are disposed. The additional height of the horizontal portion of the passageway 234 is intended to enable a service technician to crawl into the interior of the housing 216 so that the desired maintenance may be performed on the electrical generator subassemblies 204. It is to be understood that the sizes and locations of the access manhole 214 and the passageway 234 can be varied without departing from the spirit of the invention. For example, rather than passing through side 216b of the housing 216, the horizontal portion of the passageway 234 could alternatively extend through side plate 216c, one of the end plates 216d, 216e, or through the bottom plate 216f.

In a preferred embodiment, the access manhole 214 is of heavy-duty construction, and has a diameter of approximately two-feet and six inches (2'-6"). Although, it is to be understood that the manhole 214 can be formed using other diameters without departing from the spirit and scope of the invention.

Figure 8:
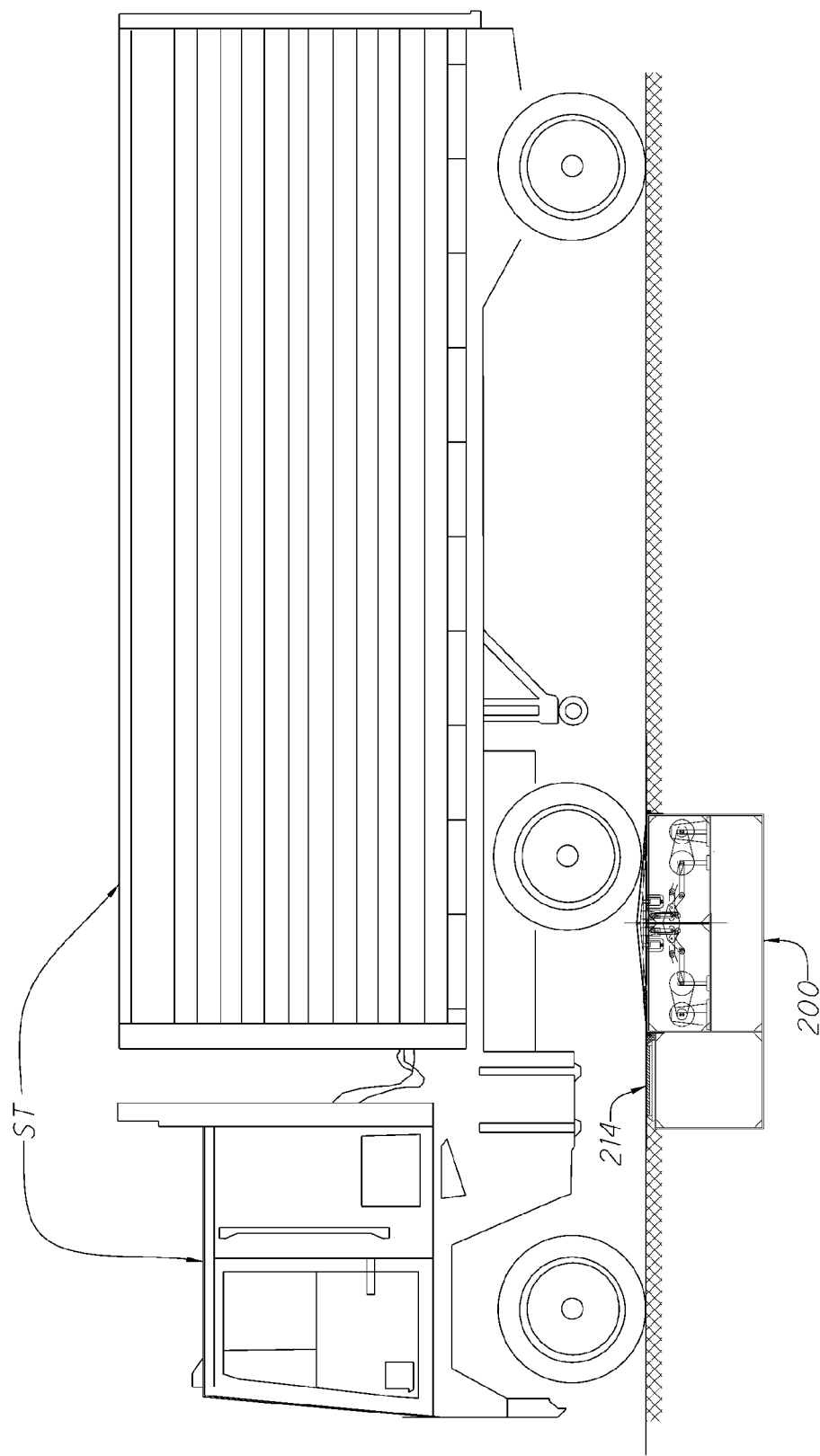
FIG. 8 is a sectional side view of the electrical generator apparatus according to the second embodiment of the invention installed on a roadway with a semi-truck depicted thereon.
Figure 9:
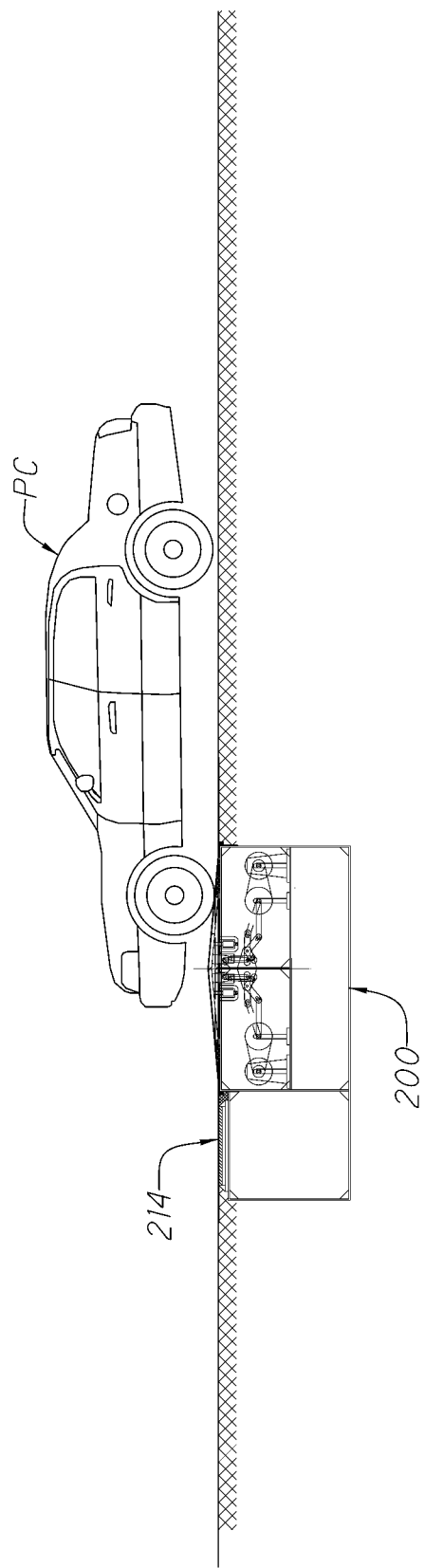
FIG. 9 is a sectional side view of the electrical generator apparatus according to the second embodiment of the invention installed on a roadway with a passenger car depicted thereon.

FIG. 8 depicts the electrical generator apparatus 200 and associated access manhole 214 on a roadway with a semi-truck ST shown thereon. Similarly, FIG. 9 depicts the electrical generator apparatus 200 and manhole 214 on a roadway with passenger car PC depicted thereon. The purpose of these two figures is simply to give an illustrative example of the relative size of the electrical generator apparatus 200 as compared to that of common vehicles, such as the semi-truck ST and the passenger car PC, travelling on a roadway. One of ordinary skill in the art will readily appreciate that the relative sizes of the electrical generator apparatus 200 illustrated in FIGS. 8 and 9 are merely exemplary in nature, and thus are in no way intended to limit the scope of the invention. It also will be readily apparent to one of ordinary skill in the art that the electrical generator apparatus 200 can be formed in many different sizes, and that all of these variations are included within the scope of the claimed invention.

Figure 10:
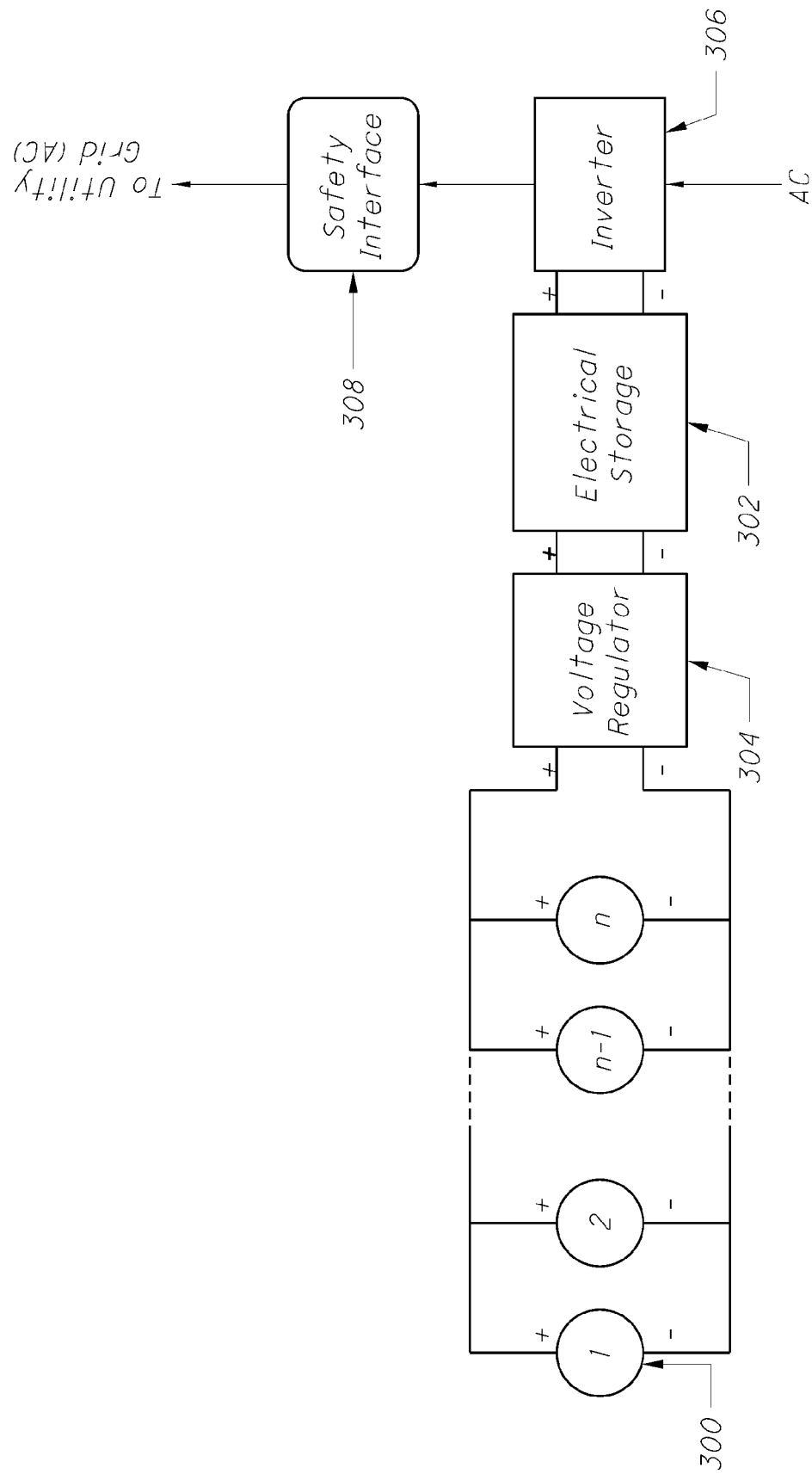
FIG. 10 is an electrical schematic diagram of one electricity collection system used in conjunction with the exemplary embodiments of the electrical generator apparatuses described herein.

In FIG. 10, an electrical schematic diagram of an exemplary electricity collection system used in conjunction with the illustrated embodiments of electrical generator apparatus is depicted. One of ordinary skill in the art will readily appreciate that the electricity collection system illustrated in FIG. 10 is simply one example of an electrical collection system that can be utilized with the electrical generator apparatuses 100, 200, 400, 500 and therefore, the invention is in no way limited to this particular configuration. In FIG. 10, a plurality of generators 300 wired in parallel is electrically connected to an electrical storage device 302. The plurality of generators 300 produce direct current (DC) power. In a preferred embodiment, the electrical storage device 302 comprises one or more batteries for storing the electrical energy generated by one or more electrical generator apparatuses 100, 200, 400, 500. However, in other embodiments of the invention, a different type of electrical storage device could be employed, such as capacitors or ultracapacitors. A voltage regulator 304 for automatically maintaining a constant voltage level is electrically connected to the electrical storage device 302. On its output side, the voltage regulator 304 is electrically connected to an inverter 306 that converts the incoming direct current (DC) from the voltage regulator 304 into alternating current (AC) for power use. After passing through both the voltage regulator 304 and the inverter 306, the output power from the electrical generator apparatuses 100, 200, 400, 500 has the same voltage and frequency as the local power grid. Although, before being transmitted to the utility grid, the alternating current (AC) on the output side of the inverter 306 passes through a safety interface device 308.

3. Third Embodiment

Figure 13:
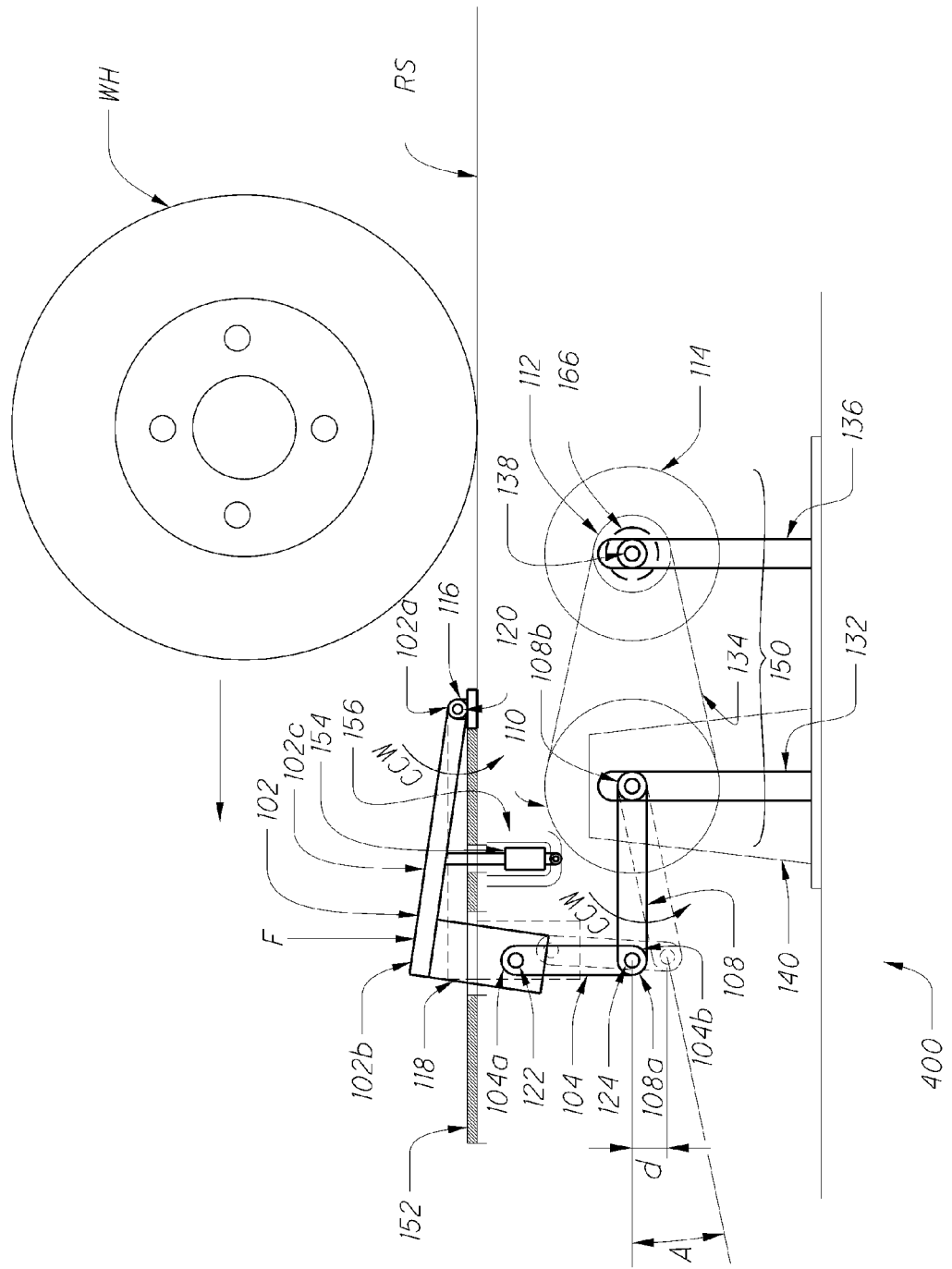
FIG. 13 is a side view of the electrical generator apparatus according to a third embodiment of the invention.

A third embodiment of an inventive electrical generator apparatus is seen generally at 400 in FIG. 13. The third embodiment is similar to that of the first embodiment, and in some respects, it is also similar to that of the second embodiment. Moreover, some parts are common to all three embodiments. For the sake of brevity, the parts that the third embodiment of the electrical generator apparatus (400) has in common with the preceding two embodiments of the electrical generator apparatus (100, 200) will not described in conjunction with the third embodiment because these components have already been explained in detail above. Furthermore, in the interest of clarity, these components will be denoted using the same reference characters that were used in the first two embodiments.

However, it is evident from FIG. 13 that the third embodiment of the electrical generator apparatus (400) also differs in several important respects from that of the first two embodiments described hereinbefore. The unique features of the third embodiment will be explained in detail below. One of ordinary skill in the art will readily appreciate that the constituent parts of the first, second, and third embodiments may be readily combined with one another without departing from the spirit and the scope of this invention.

First, turning to FIG. 13, one can see that the second end 104b of the plunger bar 104 is connected directly to the first end 108a of the crank 108 by means of pin 124 in the third embodiment. Unlike the preceding two embodiments described above, the third embodiment of the electrical generator apparatus (400) does not include the leverage bar 106.

Omitting the leverage bar 106 and directly connecting the plunger bar 104 to the crank 108 has both advantages and disadvantages. One advantage offered by the third embodiment of the invention is that the electrical generator apparatus 400 can be made more compact in size than the electrical generator apparatuses 100, 200 of the preceding two embodiments. The smaller footprint of the electrical generator apparatus 400 permits a greater quantity of electrical generator sub-assemblies to be included within a standard size housing, thereby potentially increasing the overall power output of the electrical generator apparatus. Also, eliminating the leverage bar 106 advantageously simplifies the design of the electrical generator apparatus by reducing its number of components, thereby decreasing its overall cost. However, omitting the leverage bar 106 from the electrical generator apparatus also has disadvantages as well. The primary disadvantage of the electrical generator apparatus 400, as compared to the electrical generator apparatuses 100, 200, is that the elimination of the leverage bar 106 reduces the travel angle A of the crank 108 when a vehicle applies a force F to the rotatable lever portion 102. Similarly, the vertical displacement d of the first end 108a of the crank 108 of the electrical generator apparatus 400 also is undesirably less than that of the first two embodiments, which utilize the leverage bar 106.

For electrical generator apparatuses with smaller flywheels 114, 600 and electrical generators 140, 212, the leverage bar 106 is advantageously used to increase the input angular velocity (rpm) for the electrical generators 140, 212. On the other hand, for electrical generator apparatuses with larger flywheels 114, 600 and electrical generators 140, 212 operating at lower angular velocities, the leverage bar 106 can be omitted.

In an exemplary embodiment, the travel angle A of the crank 108 of the electrical generator apparatus 400 is approximately 11.5 degrees when a vehicle applies a force F to the rotatable lever portion 102. Moreover, the vertical displacement d of the first end 108a of the crank 108 of the electrical generator apparatus 400 is approximately three and five-eighths (3⅝) inches during the downward stroke of the apparatus 400. However, it is to be understood that the exemplary travel angle and displacement are merely given by way of example, and in no way are intended to be limiting. In other embodiments, the crank 108 has travel angles and displacements that are different from the exemplary values described above.

Because the operation of the electrical generator apparatus 400 is substantially the same as that described above for the electrical generator apparatus 100 (i.e., except for the omission of the leverage bar 106), it is not necessary to reiterate the details of the operation here.

4. Fourth Embodiment

A fourth embodiment of an inventive electrical generator apparatus is seen generally at 500 in FIGS. 14 and 16-18. The fourth embodiment is similar to that of the second embodiment, and in some respects, it is also similar to that of the first and third embodiments. Moreover, some parts are common to all four embodiments. For the sake of brevity, the parts that the fourth embodiment of the electrical generator apparatus (500) has in common with the preceding three embodiments of the electrical generator apparatus (100, 200, 400) will not described in conjunction with the fourth embodiment because these components have already been explained in detail above. Furthermore, in the interest of clarity, these components will be denoted using the same reference characters that were used in the first three embodiments.

However, it is evident from FIGS. 14 and 16-18 that the fourth embodiment of the electrical generator apparatus (500) also differs in several important respects as compared to the three embodiments described hereinbefore. The unique features of the fourth embodiment will be explained in detail below. One of ordinary skill in the art will readily appreciate that the constituent parts of the first, second, third, and fourth embodiments may be readily combined with one another without departing from the spirit and the scope of this invention.

First, turning to FIG. 14, it can be seen that the upper end of each plunger block 118 is operatively coupled to a corresponding ramp plate that includes a preformed polymer cover 502 and a compressible filler material 504, rather than the fiber reinforced polymer (FRP) panel section 202 depicted in the second embodiment of FIG. 2. As shown in FIG. 14, and similar to the second embodiment of FIG. 2, the preformed polymer cover 502 and the compressible filler material 504 are structurally supported on a panel support structure 208, which is pivotally mounted about a ramp plate hinge 206. In the unloaded state of the electrical generator apparatus 500 illustrated in FIG. 14, the support structures 208 are inclined upwardly toward one another, while the preformed polymer material 502 is disposed generally flush with respect to the roadway pavement. Unlike the second embodiment described hereinbefore, the ramp plates of the electrical generator 500 assume a depressed position when the wheel WH of a vehicle passes thereover (i.e., each of the plates slope downwardly to a central valley located at the ramp plate center hinge 210').

A detailed view of the ramp plate center hinge 210' of the fourth embodiment is illustrated in FIG. 15. The ramp plate center hinge 210' of the fourth embodiment is similar in most respects to the ramp plate center hinge 210 of the second embodiment, except for the preformed polymer cover 502 and the compressible filler material 504 being disposed above the complementary edges 240 of the two inclined panel support structures 208, rather than the FRP panel sections 202.

In a preferred embodiment, the ramp plates of the fourth embodiment are generally flush with respect to the roadway pavement when the plates are in an unloaded position (see e.g., FIG. 14). When a vehicle passes over the ramp plates, they rotate downwardly and assume a depressed position when the weight of the passing vehicle is applied thereto (refer to the dashed line in FIG. 14). Advantageously, the compressible filler material 504 in each ramp plate assembly minimizes the vibration experienced by the occupants of vehicle when passing over the electrical generator apparatus 500.

In one preferred embodiment of the invention, the preformed polymer cover 502 of the ramp plates is formed from neoprene and has a treated surface, while the compressible filler material 504 is formed from a molded neoprene filler. However, one of ordinary skill in the art will appreciate that, in other embodiments of the invention, the preformed polymer cover 502 and the compressible filler material 504 could be formed using other suitable materials.

Figure 18:
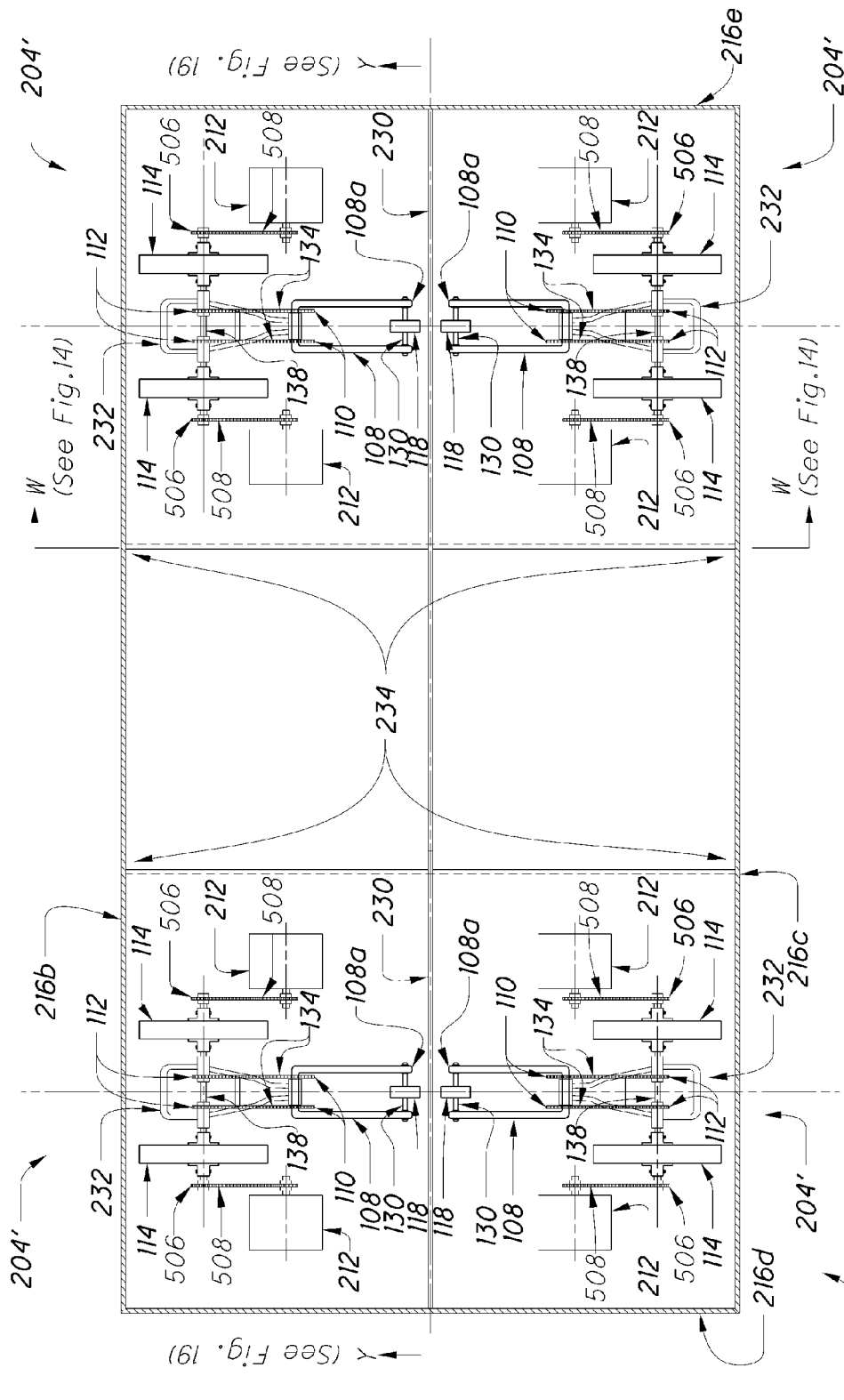
FIG. 18 is yet another top view of the electrical generator apparatus according to the fourth embodiment of the invention, but with the top plate of the housing removed, which is denoted by cutting-plane line X-X in FIG. 14.
Figure 19:
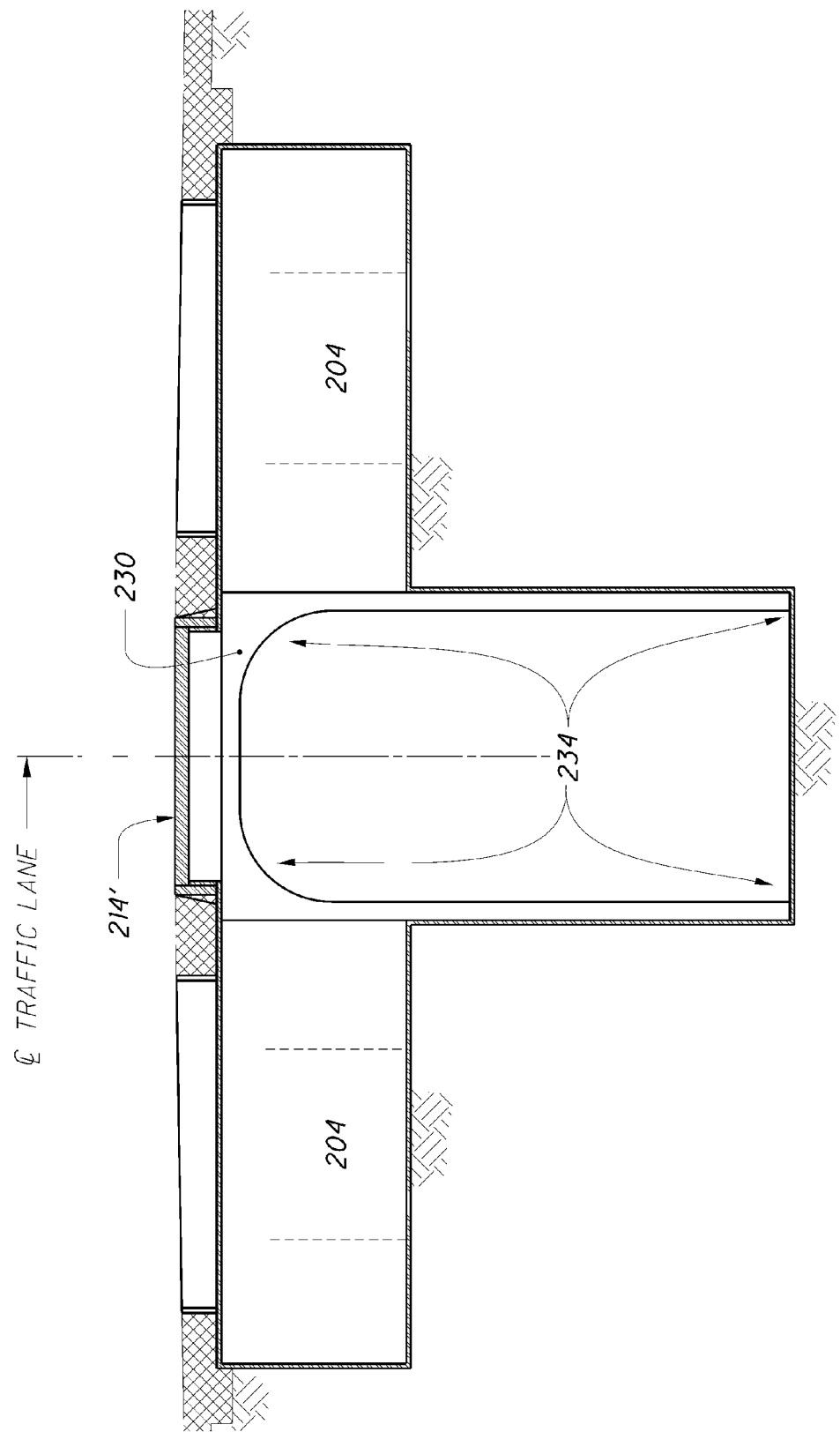
FIG. 19 is a sectional side view of the electrical generator apparatus according to the fourth embodiment of the invention, which is denoted by cutting-plane lines Y-Y in FIG. 18, depicting the maintenance access passageway.

Similar to the second embodiment described above, the fourth embodiment of the electrical generator apparatus (500) comprises a first plurality of electrical generator sub-assemblies 204' arranged in mirrored relationship to a second plurality of electrical generator sub-assemblies 204' (refer to FIGS. 14 and 18). However, the electrical generator sub-assemblies 204' of the fourth embodiment differ in several significant respects from that of the second embodiment. First, similar to the third embodiment, the leverage bar 106 is omitted from each electrical generator sub-assemblies 204', and the plunger bar 104 of each sub-assembly 204' is connected directly to the crank 108. Omitting the leverage bars 106 from the electrical generator sub-assemblies 204' of the fourth embodiment has the same advantages and disadvantages that were described above with regard to the third embodiment. Secondly, unlike in the second embodiment of the electrical generator apparatus (200), the electrical generators 212 of the electrical generator sub-assemblies 204' in the fourth embodiment are not connected directly to the respective output shafts 138. Rather, as best illustrated in FIG. 18, each electrical generator 212 is offset with respect to its associated output shaft 138 and is connected thereto by means of a third wheel 506 disposed on an opposed end of its respective output shaft 138 and a tangential coupling element 508. Offsetting each electrical generator 212 with respect to its associated output shaft 138 is advantageous because it obviates the need for close tolerances at the connection of electrical generator 212 to its associated output shaft 138. Like the tangential coupling element 134, the tangential coupling element 508 may take the form of a belt, a chain, or any other coupling device that is capable transferring the rotational motion of the third wheel 506 to the electrical generator 212 with minimal slippage.

Now, maintenance access to the electrical generator apparatus 500 will be described with reference to FIGS. 14 and 16-19. Like the second embodiment of the electrical generator apparatus (200), service access to the electrical generator apparatus 200 will be achieved using an access manhole 214' and associated passageway 234. Although, unlike the second embodiment of the invention, the manhole 214' will be placed directly above the passageway 234 and between the electrical generator sub-assemblies 204' (see FIGS. 16, 17, and 19), rather adjacent to the housing 216 as in the second embodiment. Also, in the fourth embodiment of the invention, the passageway 234 only comprises a horizontal pathway that extends between a plurality of electrical generator subassemblies 204' (refer to FIGS. 18 and 19).

In a preferred embodiment, the access manhole 214' is of heavy-duty construction, and has a generally square shape with sides that have a length of approximately two-feet and six inches (2'-6"). Although, it is to be understood that the manhole 214' can be formed using other shapes and dimensions without departing from the spirit and scope of the invention.

Figure 16:
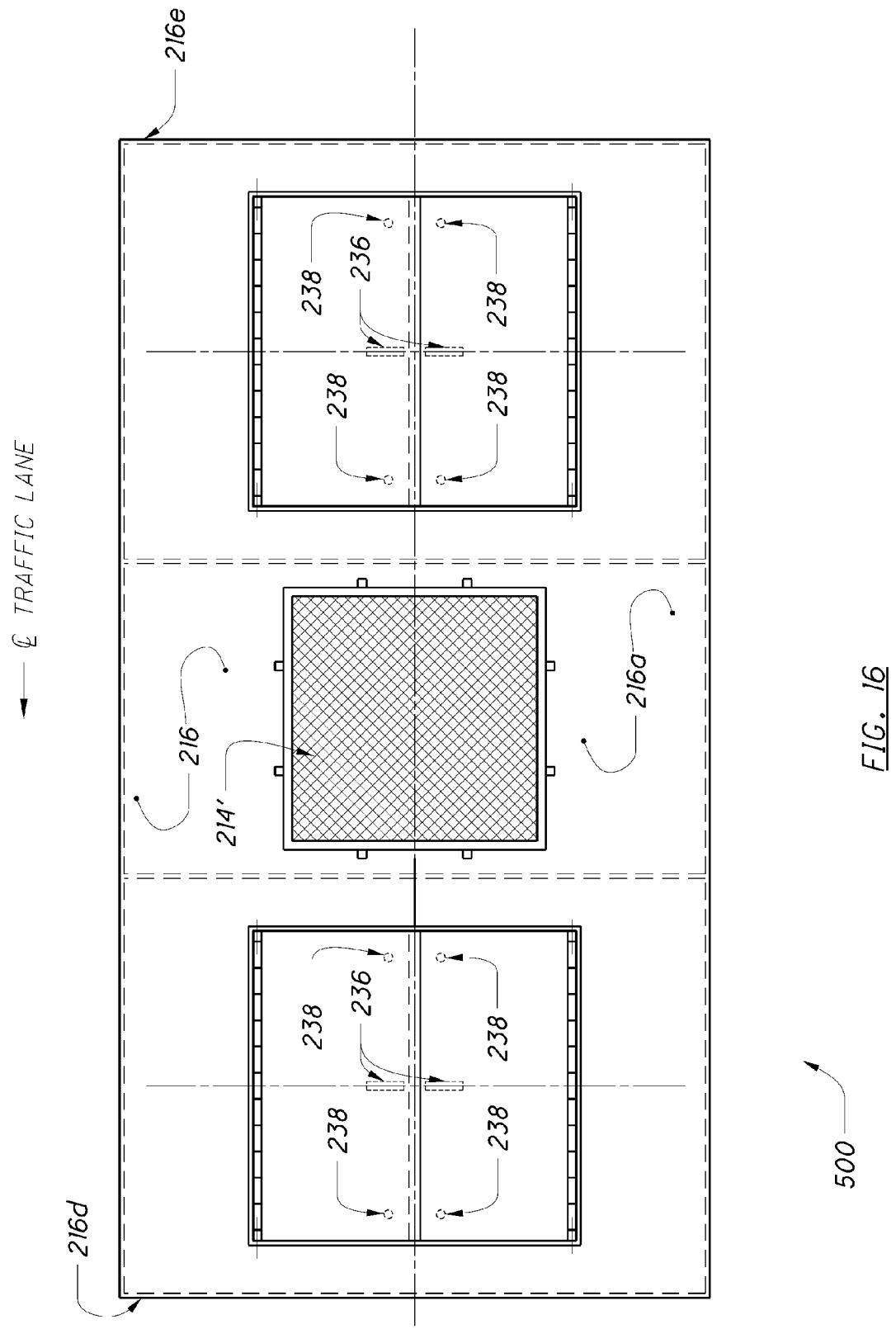
FIG. 16 is a top view of the electrical generator apparatus according to the fourth embodiment of the invention with the ramp plates shown on the top of the housing.
Figure 17:
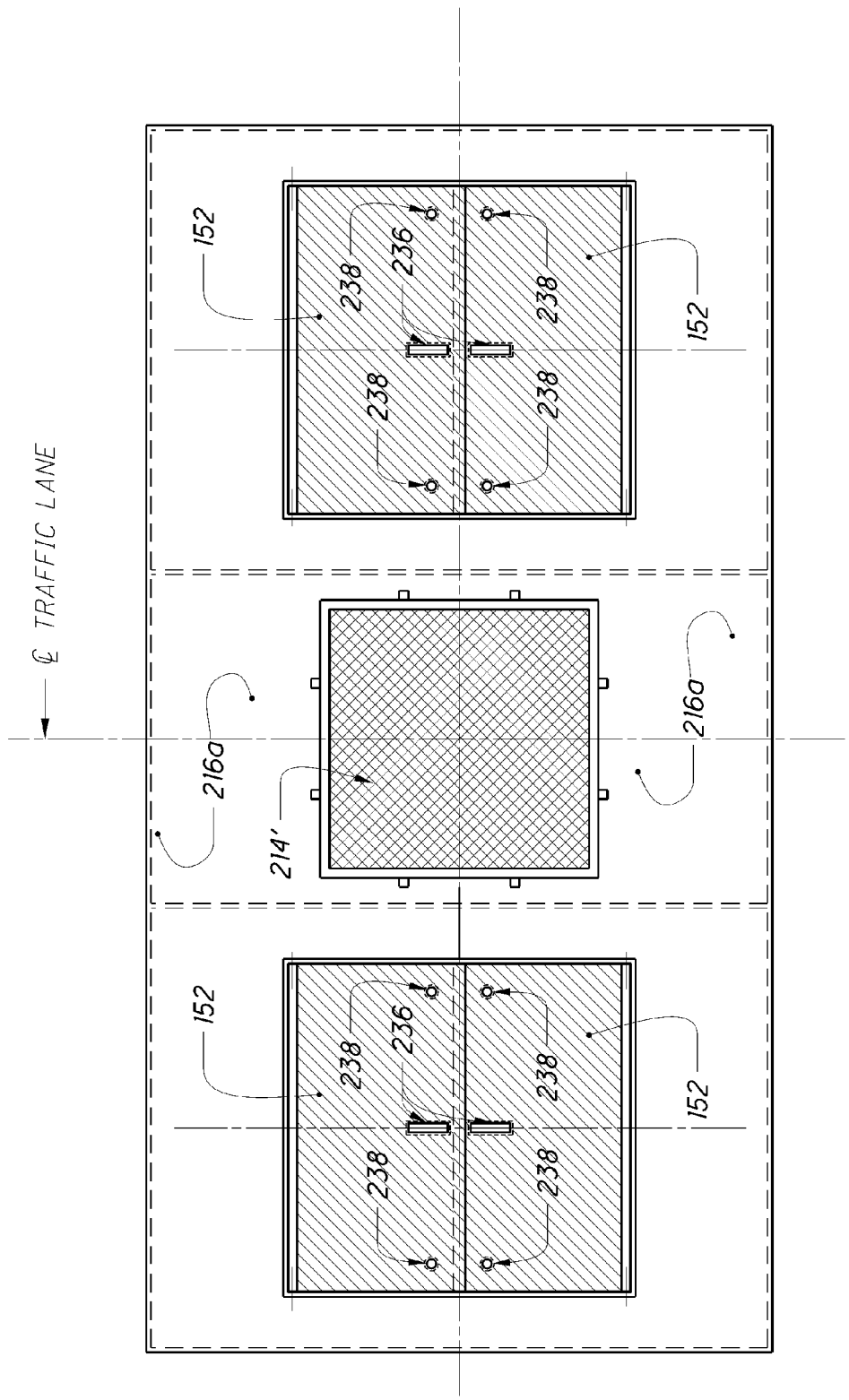
FIG. 17 is another top view of the electrical generator apparatus according to the fourth embodiment of the invention with the ramp plates removed from the housing.

Advantageously, the split configuration of the ramp plates in the fourth embodiment of the invention (i.e., two sets of ramp plates are disposed on opposite sides of the manhole 214'—see FIG. 16) allows the electrical generator apparatus 500 to be more easily integrated into a roadway having a sloped surface. It is common for roadways to be provided with both a longitudinal slope (e.g., when the roadway is directed along an incline or decline) and a transverse slope from the crown in the middle of the roadway to its shoulder edge. Unlike the ramp plates in the second embodiment that span substantially the entire width of a lane of traffic, the ramp plates in the fourth embodiment have a width that is substantially less than a lane of traffic. For example, in one non-limiting embodiment, the ramp plates have a width that is approximately equal to three feet (3'-0").

Because the operation of the electrical generator apparatus 500 is substantially the same as that described above for the electrical generator apparatus 200 (i.e., except for the omission of the leverage bar 106 and the contour of the ramp plates), it is not necessary to reiterate the details of the operation here.

Figure 20:
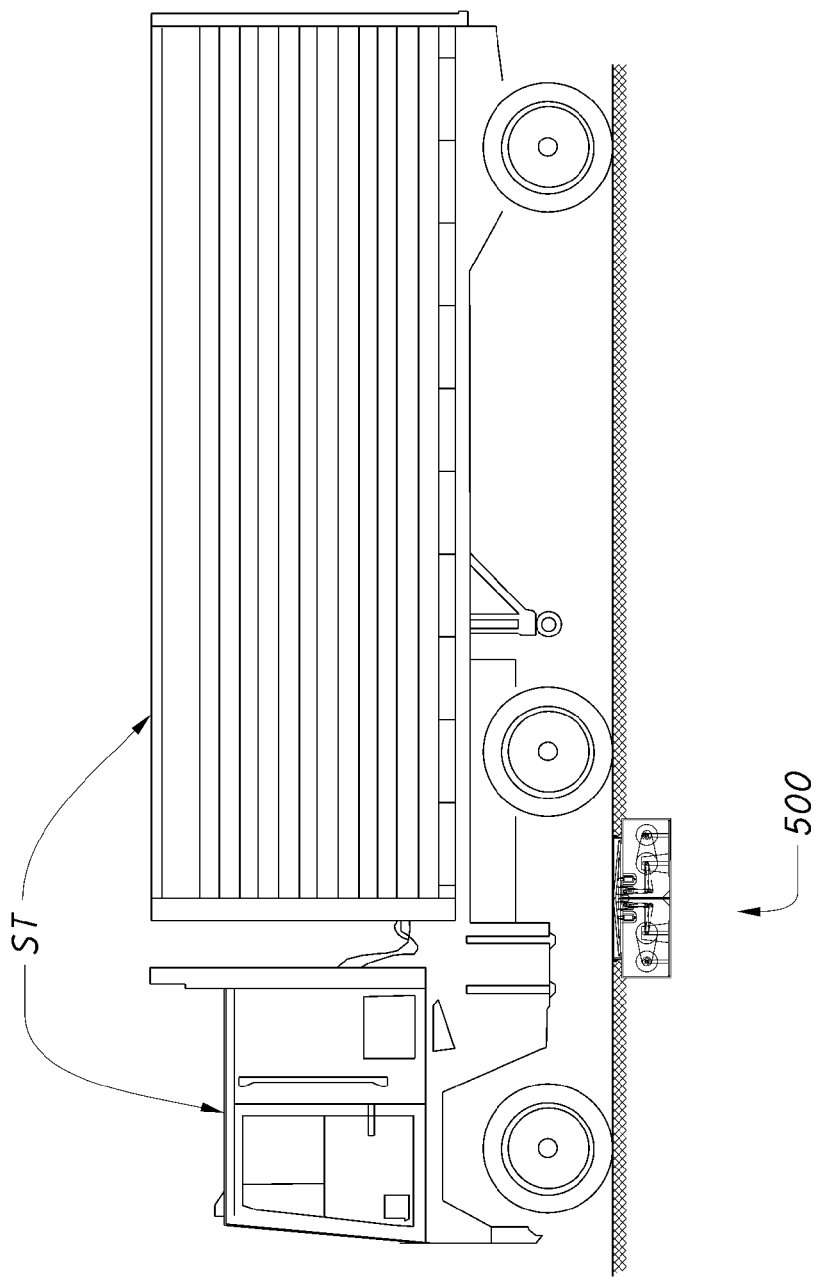
FIG. 20 is a sectional side view of the electrical generator apparatus according to the fourth embodiment of the invention installed on a roadway with a semi-truck depicted thereon.
Figure 21:
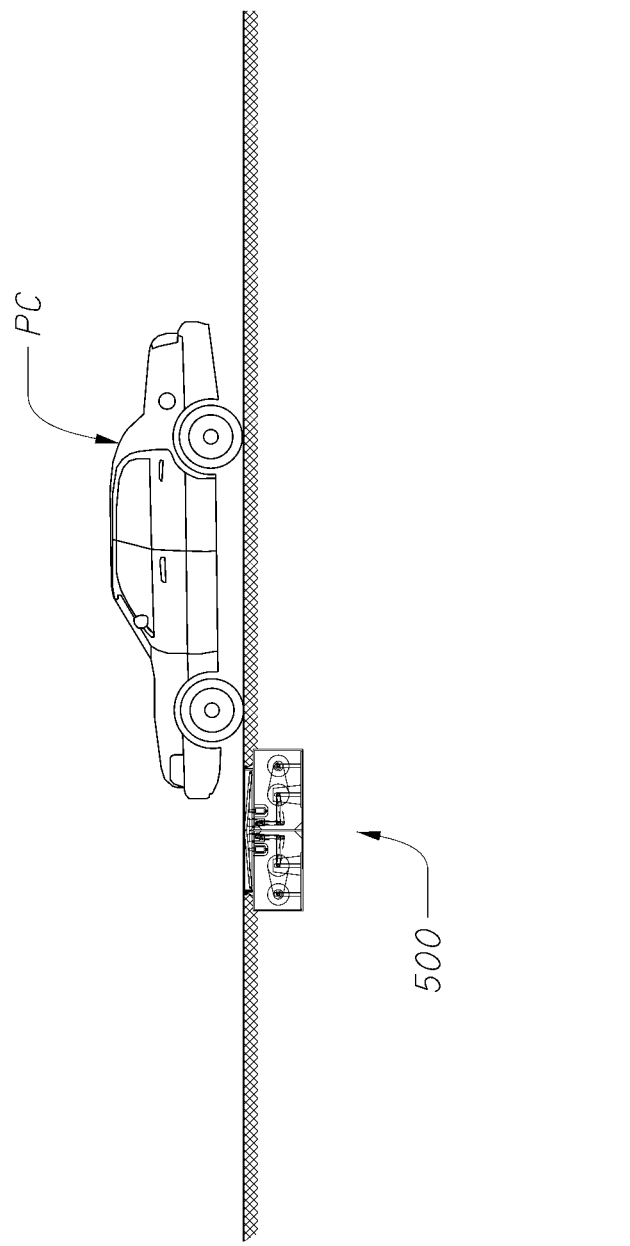
FIG. 21 is a sectional side view of the electrical generator apparatus according to the fourth embodiment of the invention installed on a roadway with a passenger car depicted thereon.

FIG. 20 depicts the electrical generator apparatus 500 on a roadway with a semi-truck ST shown thereon. Similarly, FIG. 21 depicts the electrical generator apparatus 500 on a roadway with passenger car PC depicted thereon. Like FIGS. 8 and 9 that were described previously with regard to the second embodiment, the purpose of these two figures is simply to give an illustrative example of the relative size of the electrical generator apparatus 500 as compared to that of common vehicles, such as the semi-truck ST and the passenger car PC, travelling on a roadway.

Figure 22:
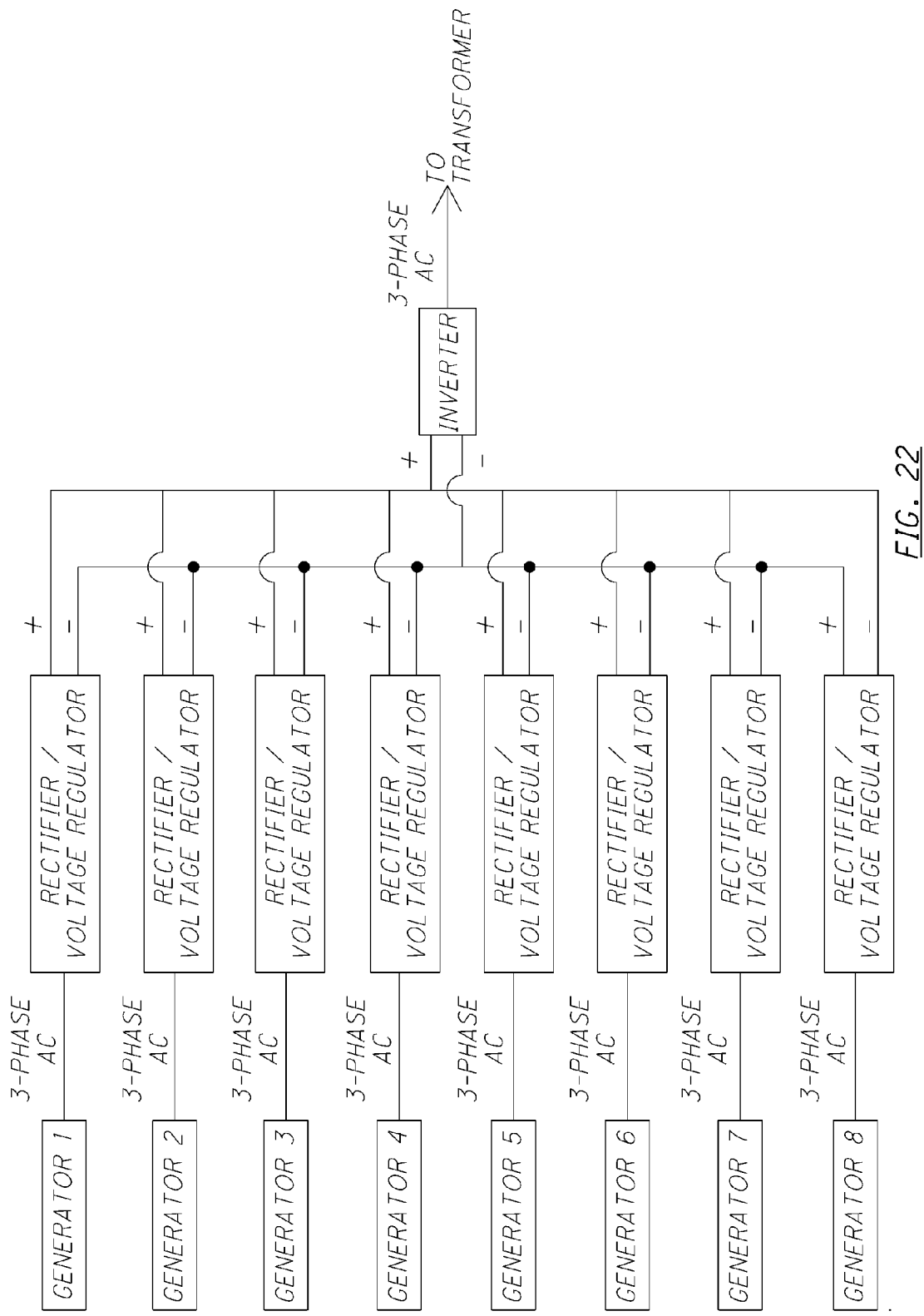
FIG. 22 is an electrical schematic diagram of another electricity collection system used in conjunction with the exemplary embodiments of the electrical generator apparatuses described herein.

In FIG. 22, an electrical schematic diagram of an alternative exemplary electricity collection system used in conjunction with the illustrated embodiments of the electrical generator apparatus is depicted. One of ordinary skill in the art will readily appreciate that the electricity collection system illustrated in FIG. 22 is simply another example of an electrical collection system that can be utilized with the electrical generator apparatuses 100, 200, 400, 500 and therefore, the invention is in no way limited to this particular configuration. In FIG. 22, a plurality of alternating current (AC) generators are each coupled to a respective rectifier/voltage regulator. Because the 3-phase AC output from each generator will be of varying frequencies, it needs to be conditioned prior to being transmitted to the common inverter in FIG. 22. The rectifier portion of each respective rectifier/voltage regulator is used to convert the 3-phase AC output from each generator into a direct current (DC) output, while the voltage regulator portion of the each respective rectifier/voltage regulator is used for automatically maintaining a constant voltage level. On their output sides, each rectifier/voltage regulator is electrically connected to an inverter that converts the incoming direct current (DC) from each rectifier/voltage regulator into alternating current (AC) for power use (e.g., 110-120 V, 60 Hz). After passing through the common inverter, the 3-phase AC output power from the electric generating system can be transformed into a higher voltage by utilizing a transformer, if required, to meet the voltage requirements of the power grid.

An alternative embodiment of the flywheel used in connection with the electrical generator apparatuses 100, 200, 400, 500 is shown in FIGS. 23 and 24. At its approximate geometric center, the flywheel 600 has a hub 602, which operatively connects the flywheel 600 to the output shaft 138. In an exemplary embodiment, a plurality of set screws 604 are used to securely attach the hub 602 to the output shaft 138. As best illustrated in FIG. 23, the flywheel 600 has a plurality of spokes 606 extending radially outward from the hub 602. Each spoke 606 comprises an outer tubular member 606a that surrounds an inner rod 606b. The spokes 606 of the flywheel 600 are generally equally spaced-apart from one another and, together with the hub 602 and a rim portion 610, define a plurality of substantially pie-shaped apertures 608 in the flywheel 600. Referring to FIG. 24, it can be seen that the first end portion of each inner rod 606b is fixedly attached to the hub 602, while the second, opposed end portion of each inner rod 606b is fixedly attached to an inner annular member 610b of the rim portion 610. The rim portion 610, which is located at the outer periphery of the flywheel 600, also has a pair of outer annular members 610a that are releasably attached to opposed sides of the inner annular member 610b by means of a plurality of fasteners, such as screws 612. Advantageously, the detachable outer annular members 610a make it easy to adjust the mass of the flywheel 600, and consequently, its moment of inertia. Like the flywheel 114 described above, the flywheel 600 is designed to concentrate the bulk of its mass in the portion of the flywheel 600 that has the largest radii, namely the rim portion 610.

In one or more embodiments, the aforedescribed electrical generator apparatuses 100, 200, 400, 500 may further include one or more spring members for temporarily storing the energy that is generated by the vehicles passing over the rotatable top portion 102, 202, 502 of the electrical generator apparatuses 100, 200, 400, 500. In particular, the one or more spring members may comprise one or more torsional springs that are operatively coupled to the rotatable output shafts 138. Advantageously, the use of one or more torsional springs allows the rotational energy that is transmitted by the output shafts 138 to be temporarily stored so that the energy generated by the vehicles on the roadway can be conveyed to the generators 212 in a more consistent and regulated manner (e.g., so as to reduce abrupt spikes in the energy output, etc.).

It is readily apparent that the aforedescribed electrical generator apparatuses 100, 200, 400, 500 offer numerous advantages. First, these electrical generator electrical generator apparatuses materially contribute to the more efficient utilization and conservation of petroleum-based energy resources by harvesting the otherwise wasted kinetic energy of moving vehicles. Secondly, electrical generator apparatuses 200 and 500 are particularly designed such that they can be easily integrated into a typical roadway without substantially disturbing the normal contour of the pavement, and without alarming motorists who encounter the apparatuses on the roadway. As such, electrical generator apparatuses 200 and 500 are suitable for use on roadways where vehicles are travelling at a high rate of speed, such as freeways and highways. Also, each of the electrical generator apparatuses 100, 200, 400, 500 utilizes a simple arrangement of mechanical components to transfer an external actuation force applied by a vehicle to one or more electrical generators, the components being less susceptible to fatigue failure as compared to gear and cam mechanisms used in other systems. In addition, none of the electrical generator apparatuses 100, 200, 400, 500 employ any complex fluid or hydraulic systems. Advantageously, the electrical generator apparatuses 100, 200, 400, 500 of the aforedescribed embodiments provide an auxiliary source of electrical energy for powering various devices, such as roadway lights, toll booths, and rest stops along interstate highways.

Although the invention has been shown and described with respect to a certain embodiment or embodiments, it is apparent that this invention can be embodied in many different forms and that many other modifications and variations are possible without departing from the spirit and scope of this invention.

For example, while the electrical generator apparatuses 100, 200, 400, 500 have been described hereinabove as being installed in typical roadway pavement, it is to be understood the inventor has also contemplated installing the electrical generator apparatuses 100, 200, 400, 500 beneath the bridge decks of steel or pre-stressed concrete girder bridges. In such an installation, special bracing members would be required between the girders in order to support the apparatuses 100, 200, 400, 500. Also, in order to safely accommodate a plurality of electrical generator apparatuses 100, 200, 400, 500 on a bridge, the typical girder framing of the bridge (i.e., the girders and the traverse cross-frames) would potentially require additional reinforcing. Alternatively, or in addition to such reinforcing, the size of the framing members may need to be increased.

Moreover, as another example, while a tube spring 154 is described hereinabove as the means for urging the rotatable top portions (e.g., the rotatable lever portion 102 and rotatable ramp plates) back into their upward positions, the inventor has also contemplated using a link pivotally mounted about its approximate center (i.e., a seesaw-type link) as an alternative means for performing this functionality. In such an arrangement, the one end of the pivotally mounted link would be operatively coupled to a "button" in the roadway, while the second, opposite end of the pivotally mounted link would be operatively coupled to the rotatable top portion of the electrical generator apparatuses 100, 200, 400, 500. Thus, when the approaching wheels of a vehicle (e.g., the rear wheels mounted on the rear axle of the passenger car or truck) passes over the "button", the pivotally mounted link attached thereto is rotated, and the opposite end of the pivotally mounted link urges the rotatable top portion back into its upward position if it is in a depressed position (e.g., after it has been depressed by the front wheels mounted on the front axle of the passenger car or truck). If the rotatable top portion is already in its upward position, then the depressing of the "button" by wheels of the vehicle will not have any effect on the position of the rotatable top portion. The use of a pivotally mounted link (i.e., a seesaw-type link) in lieu of a tube spring 154 offers several advantages. First, the resistance of the pivotally mounted link will be less than that of the tube spring 154, and thus, will interfere less with the downward rotation of the rotatable top portion. In order to effectively urge the rotatable top portion to its upward position, the resistance of the tube spring 154 must be very large, which will deleteriously result in a reduction of the downward force applied to the electrical generator apparatuses 100, 200, 400, 500 by cars and trucks passing thereover. Secondly, by employing the pivotally mounted link rather the tube spring 154, potential issues with the overheating of the spring will be obviated. Because the tube spring 154 is being constantly compressed as cars and trucks are passing over the electrical generator apparatuses 100, 200, 400, 500, it is likely to get extremely hot. Finally, the use of the pivotally mounted link in lieu of the tube spring 154 will reduce the amount of maintenance that is required for the electrical generator apparatuses 100, 200, 400, 500. As a result of its repetitive loading and unloading, the tube spring 154 will be susceptible to fatigue failure, which would necessitate its periodic replacement.

While exemplary embodiments have been described herein, one of ordinary skill in the art will readily appreciate that the exemplary embodiments set forth above are merely illustrative and should not be construed as to limit the claims in any manner. Rather, the scope of the invention is defined only by the appended claims and their equivalents, and not, by the preceding description.

The invention claimed is:

1. An electrical generator system configured to convert an external actuation force applied by a vehicle traveling on a roadway into electrical energy, the electrical generator system comprising:
    at least one electrical generator apparatus, the at least one electrical generator apparatus including:
        a rotatable top portion adapted to receive the external actuation force applied by the vehicle traveling on the roadway;
        at least one linkage member, the rotatable top portion being operatively coupled to the at least one linkage member;
        a first wheel operatively coupled to the at least one linkage member without the use of gears;
        a second wheel operatively coupled to the first wheel via a tangential coupling element, the second wheel being configured to rotate at a higher angular velocity than the first wheel;
        a rotatable shaft operatively coupled to the second wheel;
        at least one flywheel operatively coupled to the rotatable shaft; and
        at least one electrical generator operatively coupled to the rotatable shaft, the at least one electrical generator adapted to convert a rotational movement of the rotatable shaft into electrical energy;
    a maintenance access assembly disposed adjacent to the at least one electrical generator apparatus, the maintenance access assembly including a plurality of bounding walls defining a maintenance passageway for gaining service access to the at least one electrical generator apparatus, the maintenance access assembly further including an access manhole disposed in an upper one of the plurality of bounding walls and above the maintenance passageway so as to facilitate access to the maintenance passageway.

2. The electrical generator system according to claim 1, wherein the at least one linkage member of the at least one electrical generator apparatus comprises a plurality of linkage members, the rotatable top portion and the first wheel being operatively coupled to the plurality of linkage members; and wherein, when the external actuation force is applied by the vehicle travelling on the roadway, one of the plurality of linkage members undergoes substantially translational movement and another one of the plurality of linkage members undergoes oscillatory movement.

3. The electrical generator system according to claim 1, wherein the rotatable top portion of the at least one electrical generator apparatus comprises a first end region and a second end region, the first end region of the rotatable top portion being rotatably connected to a support, and the second end region of the rotatable top portion being operatively coupled to the at least one linkage member by means of a downwardly protruding portion.

4. The electrical generator system according to claim 1, wherein the rotatable top portion of the at least one electrical generator apparatus further comprises:
    an upper layer of fiber reinforced polymer (FRP); and
    a lower support structure disposed underneath the upper layer of fiber reinforced polymer (FRP).

5. The electrical generator system according to claim 1, wherein the rotatable top portion of the at least one electrical generator apparatus further comprises:
    a preformed polymer cover;
    a compressible filler material disposed underneath the preformed polymer cover; and
    a lower support structure disposed underneath the compressible filler material;
wherein the lower support structure is operatively connected to the at least one linkage member by means of a downwardly protruding portion.

6. The electrical generator system according to claim 1, wherein the tangential coupling element of the at least one electrical generator apparatus comprises one of: (i) a chain and (ii) a belt.

7. The electrical generator system according to claim 1, wherein the at least one flywheel of the at least one electrical generator apparatus comprises two or more flywheels.

8. The electrical generator system according to claim 1, wherein a shaft of the at least one electrical generator is offset with respect to the rotatable shaft, and the shaft of the at least one electrical generator is operatively connected to the rotatable shaft via an additional tangential coupling element.

9. The electrical generator system according to claim 1, wherein the maintenance passageway of the maintenance access assembly comprises a floor, the floor of the maintenance passageway being disposed at a lower elevation relative to the ground than a bottom wall of a housing containing the at least one electrical generator apparatus so as to provide increased headroom height for servicing of the at least one electrical generator apparatus.

10. The electrical generator system according to claim 1, wherein the at least one electrical generator apparatus comprises a pair of electrical generator apparatuses, and the maintenance passageway of the maintenance access assembly is disposed between a first one of the pair of electrical generator apparatuses and a second one of the pair of electrical generator apparatuses.

* * * * *